(12) United States Patent
Josefsson et al.

(10) Patent No.: US 12,320,131 B2
(45) Date of Patent: *Jun. 3, 2025

(54) THERMOPLASTIC-BASED BUILDING PANEL COMPRISING A BALANCING LAYER

(71) Applicant: CERALOC INNOVATION AB, Viken (SE)

(72) Inventors: Per Josefsson, Ramlösa (SE); Christoffer Nilsson, Helsingborg (SE); Filip Sköld, Löddeköpinge (SE)

(73) Assignee: CERALOC INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,429

(22) Filed: Jun. 15, 2023

(65) Prior Publication Data

US 2023/0323677 A1 Oct. 12, 2023

Related U.S. Application Data

(63) Continuation of application No. 17/130,783, filed on Dec. 22, 2020, now Pat. No. 11,725,398.

(30) Foreign Application Priority Data

Dec. 27, 2019 (SE) ..................................... 1951558-4
Dec. 27, 2019 (SE) ..................................... 1951559-2

(51) Int. Cl.
*E04B 2/00* (2006.01)
*B32B 3/06* (2006.01)
(Continued)

(52) U.S. Cl.
CPC .............. *E04F 15/107* (2013.01); *B32B 3/06* (2013.01); *B32B 27/08* (2013.01); *B32B 27/20* (2013.01);
(Continued)

(58) Field of Classification Search
CPC ........... E04F 15/107; B32B 3/06; B32B 27/08
See application file for complete search history.

(56) References Cited

U.S. PATENT DOCUMENTS 2,004,917 A 6/1935 Johnson
2,031,596 A 2/1936 Fulbright
(Continued)

FOREIGN PATENT DOCUMENTS

CA 2903432 A1 1/2008
CN 111946009 A 11/2020
(Continued)

OTHER PUBLICATIONS

European Search Report dated Dec. 7, 2023, by the European Patent Office in European Application No. EP20906254, 10 Pages.
(Continued)

*Primary Examiner* — Basil S Katcheves
(74) *Attorney, Agent, or Firm* — Boone IP Law

(57) ABSTRACT

A thermoplastic-based building panel, such as a floor panel. The building panel includes an upper layer arrangement, a lower layer arrangement, and a balancing layer provided between the lower and the upper layer arrangement. The building panel further includes a groove arrangement including grooves. A thermoplastic-based building panel including an upper layer arrangement and a balancing layer which is a bottom layer of the building panel. The building panel includes a groove arrangement, wherein a major portion of the grooves therein is provided in the balancing layer only. A thermoplastic-based building panel including a mechanical locking system for horizontally and/or vertically locking the building panel to an adjacent building panel. The mechanical locking system includes a cooperating surface (Continued)

which is situated in a balancing layer and is configured to cooperate with a cooperating surface of an adjacent building panel.

21 Claims, 12 Drawing Sheets

(51) Int. Cl.
- B32B 27/08 (2006.01)
- B32B 27/20 (2006.01)
- B32B 27/22 (2006.01)
- B32B 27/30 (2006.01)
- E04F 15/02 (2006.01)
- E04F 15/10 (2006.01)

(52) U.S. Cl.
CPC ............ B32B 27/22 (2013.01); B32B 27/304 (2013.01); E04F 15/02038 (2013.01); E04F 15/105 (2013.01); B32B 2250/03 (2013.01); B32B 2250/246 (2013.01); B32B 2264/104 (2013.01); B32B 2307/4026 (2013.01); B32B 2419/04 (2013.01); E04F 2201/0146 (2013.01); E04F 2201/0153 (2013.01); E04F 2201/023 (2013.01); E04F 2201/042 (2013.01); E04F 2201/0535 (2013.01); E04F 2203/08 (2013.01)

(56) References Cited

U.S. PATENT DOCUMENTS

| | | |
|---|---|---|
| 2,088,238 A | 7/1937 | Ray |
| 2,269,927 A | 1/1942 | Crooks |
| 2,324,628 A | 7/1943 | Kahr |
| 3,234,074 A | 2/1966 | Bryant |
| 3,619,964 A | 11/1971 | Passaro et al. |
| 3,908,053 A | 9/1975 | Hettich |
| 5,103,614 A | 4/1992 | Kawaguchi et al. |
| 5,109,898 A | 5/1992 | Schacht |
| 5,190,799 A | 3/1993 | Ellingson, III |
| 5,208,086 A | 5/1993 | Owens |
| 5,540,025 A | 7/1996 | Takehara et al. |
| 5,879,781 A | 3/1999 | Mehta et al. |
| 5,900,099 A | 5/1999 | Sweet et al. |
| 6,156,402 A | 12/2000 | Smith |
| 6,182,413 B1 | 2/2001 | Magnusson |
| 6,343,451 B1 | 2/2002 | Chih et al. |
| 6,455,127 B1 | 9/2002 | Valtanen |
| 6,465,046 B1 | 10/2002 | Hansson et al. |
| 6,558,070 B1 | 5/2003 | Valtanen |
| 6,761,008 B2 | 7/2004 | Chen et al. |
| 6,769,219 B2 | 8/2004 | Schwitte et al. |
| 6,772,568 B2 | 8/2004 | Thiers et al. |
| 6,895,881 B1 | 5/2005 | Whitaker |
| 6,953,105 B2 | 10/2005 | Rust et al. |
| 7,152,379 B2 | 12/2006 | Lin et al. |
| 7,337,588 B1 | 3/2008 | Moebus |
| 7,413,374 B2 | 8/2008 | Rogers et al. |
| 7,918,062 B2 | 4/2011 | Chen |
| 8,029,880 B2 | 10/2011 | Liu |
| 8,082,717 B2 | 12/2011 | Dammers |
| 8,166,718 B2 | 5/2012 | Liu |
| 8,245,477 B2 | 8/2012 | Pervan |
| 8,261,507 B2 | 9/2012 | Hahn et al. |
| 8,375,674 B2 | 2/2013 | Braun et al. |
| 8,381,488 B2 | 2/2013 | Pervan |
| 8,397,456 B2 | 3/2013 | Ruhdorfer |
| 8,419,877 B2 | 4/2013 | Pervan et al. |
| 8,484,924 B2 | 7/2013 | Braun |
| 8,490,361 B2 | 7/2013 | Curry et al. |
| 8,505,255 B2 | 8/2013 | Doehring et al. |
| 8,544,232 B2 | 10/2013 | Wybo et al. |
| 8,720,151 B2 | 5/2014 | Pervan |
| 8,784,587 B2 | 7/2014 | Lindgren et al. |
| 8,828,175 B2 | 9/2014 | Roy |
| 8,839,584 B2 | 9/2014 | Sokol |
| 8,850,769 B2 | 10/2014 | Pervan |
| 8,875,464 B2 | 11/2014 | Pervan et al. |
| 8,935,899 B2 | 1/2015 | Bergelin et al. |
| 9,140,010 B2 | 9/2015 | Pervan |
| 9,194,135 B2 * | 11/2015 | Pervan .............. E04F 15/02194 |
| 9,222,267 B2 | 12/2015 | Bergelin et al. |
| 9,314,936 B2 | 4/2016 | Pervan |
| 9,482,015 B2 | 11/2016 | Pervan |
| 9,556,623 B2 | 1/2017 | Pervan |
| 9,663,956 B2 | 5/2017 | Pervan |
| 9,714,515 B2 | 7/2017 | Pervan |
| 9,758,966 B2 | 9/2017 | Bergelin et al. |
| 9,758,972 B2 * | 9/2017 | Pervan ................... E04F 15/18 |
| 9,840,849 B2 | 12/2017 | Pervan |
| 10,066,400 B2 | 9/2018 | Pervan |
| 10,472,833 B2 * | 11/2019 | Loncke .................. B32B 21/02 |
| 10,619,356 B2 | 4/2020 | Pervan |
| 10,669,724 B2 | 6/2020 | Pervan |
| 11,377,855 B2 * | 7/2022 | Josefsson .......... E04F 15/02033 |
| 11,413,852 B2 * | 8/2022 | Naeyaert ................. B32B 21/12 |
| 11,725,398 B2 * | 8/2023 | Josefsson ............... B32B 27/08 52/588.1 |
| 2002/0007608 A1 | 1/2002 | Pervan |
| 2002/0007609 A1 | 1/2002 | Pervan |
| 2002/0100231 A1 | 8/2002 | Miller et al. |
| 2002/0170258 A1 | 11/2002 | Schwitte et al. |
| 2003/0009971 A1 | 1/2003 | Palmberg |
| 2003/0037504 A1 | 2/2003 | Schwitte et al. |
| 2003/0101681 A1 | 6/2003 | Tychsen |
| 2003/0233809 A1 | 12/2003 | Pervan |
| 2004/0211143 A1 | 10/2004 | Hanning |
| 2004/0211144 A1 | 10/2004 | Stanchfield |
| 2004/0226243 A1 | 11/2004 | Lin et al. |
| 2004/0255538 A1 | 12/2004 | Ruhdorfer |
| 2005/0005558 A1 | 1/2005 | Bolduc |
| 2005/0069674 A1 | 3/2005 | Chang |
| 2005/0102937 A1 | 5/2005 | Pervan |
| 2005/0108969 A1 | 5/2005 | Whitaker |
| 2005/0138881 A1 | 6/2005 | Pervan |
| 2005/0208255 A1 | 9/2005 | Pervan |
| 2005/0268571 A1 | 12/2005 | Magnusson |
| 2006/0179773 A1 | 8/2006 | Pervan |
| 2006/0191226 A1 | 8/2006 | Kim et al. |
| 2006/0194015 A1 | 8/2006 | Sabater et al. |
| 2007/0006543 A1 | 1/2007 | Engstrom |
| 2007/0175148 A1 | 8/2007 | Bergelin et al. |
| 2007/0193180 A1 | 8/2007 | Plante |
| 2007/0292656 A1 | 12/2007 | Handojo |
| 2008/0005992 A1 | 1/2008 | Pervan |
| 2008/0008871 A1 | 1/2008 | Pervan |
| 2008/0010937 A1 | 1/2008 | Pervan et al. |
| 2008/0092473 A1 | 4/2008 | Heyns |
| 2008/0110125 A1 | 5/2008 | Pervan |
| 2008/0184647 A1 | 8/2008 | Yau |
| 2009/0155612 A1 | 6/2009 | Pervan et al. |
| 2009/0183458 A1 | 7/2009 | Gibson et al. |
| 2009/0193748 A1 | 8/2009 | Boo et al. |
| 2009/0269522 A1 | 10/2009 | Liu |
| 2010/0088990 A1 | 4/2010 | Liu |
| 2010/0129611 A1 | 5/2010 | Sugimoto |
| 2011/0030303 A1 | 2/2011 | Pervan et al. |
| 2011/0247285 A1 | 10/2011 | Wybo et al. |
| 2011/0308097 A1 | 12/2011 | Vollrath |
| 2012/0124932 A1 | 5/2012 | Schulte et al. |
| 2012/0266555 A1 | 10/2012 | Cappelle |
| 2012/0279158 A1 | 11/2012 | Konstanczak |
| 2013/0047536 A1 | 2/2013 | Pervan |
| 2013/0065072 A1 | 3/2013 | Pervan et al. |
| 2013/0145707 A1 | 6/2013 | Pervan |
| 2013/0199120 A1 | 8/2013 | Bergelin et al. |
| 2013/0260089 A1 | 10/2013 | Gorby et al. |
| 2013/0273244 A1 | 10/2013 | Vetter et al. |
| 2013/0283720 A1 | 10/2013 | Pervan et al. |
| 2014/0000197 A1 * | 1/2014 | Pervan .............. E04F 15/02038 52/309.1 |
| 2014/0215952 A1 | 8/2014 | Pervan |

(56) References Cited

U.S. PATENT DOCUMENTS

| | | |
|---|---|---|
| 2014/0283466 A1 | 9/2014 | Boo |
| 2015/0013260 A1 | 1/2015 | Pervan |
| 2015/0059927 A1 | 3/2015 | Brnnstrm et al. |
| 2015/0090400 A1 | 4/2015 | Bergelin et al. |
| 2015/0210055 A1 | 7/2015 | Pervan |
| 2015/0284964 A1 | 10/2015 | Yau |
| 2015/0343739 A1* | 12/2015 | Pervan ............... E04F 15/107 428/512 |
| 2015/0345153 A1 | 12/2015 | Pervan |
| 2016/0069089 A1 | 3/2016 | Bergelin et al. |
| 2016/0083965 A1 | 3/2016 | Baert et al. |
| 2016/0168865 A1 | 6/2016 | Pervan |
| 2016/0194883 A1 | 7/2016 | Pervan |
| 2016/0201336 A1* | 7/2016 | Pervan ............... B26D 3/065 52/582.2 |
| 2016/0208501 A1 | 7/2016 | Pervan |
| 2016/0250835 A1 | 9/2016 | Pervan |
| 2016/0265234 A1 | 9/2016 | Pervan |
| 2016/0265236 A1 | 9/2016 | Pervan |
| 2016/0340910 A1 | 11/2016 | Ramachandra et al. |
| 2016/0369507 A1 | 12/2016 | Pervan et al. |
| 2017/0009462 A1 | 1/2017 | Muehlebach |
| 2017/0114550 A1 | 4/2017 | Pervan |
| 2017/0268238 A1 | 9/2017 | Pervan |
| 2018/0080232 A1 | 3/2018 | Pervan |
| 2018/0223540 A1 | 8/2018 | Cappelle |
| 2018/0313094 A1 | 11/2018 | Pervan |
| 2018/0355620 A1 | 12/2018 | Pervan |
| 2019/0024390 A1 | 1/2019 | Yasuda et al. |
| 2019/0145109 A1 | 5/2019 | Esbelin |
| 2019/0292793 A1 | 9/2019 | Van et al. |
| 2020/0208411 A1 | 7/2020 | Pervan |
| 2020/0282589 A1 | 9/2020 | Josefsson et al. |
| 2020/0308846 A1 | 10/2020 | Josefsson et al. |
| 2021/0032877 A1 | 2/2021 | Pervan |
| 2021/0363760 A1 | 11/2021 | Pervan |

FOREIGN PATENT DOCUMENTS

| | | |
|---|---|---|
| DE | 2251762 A1 | 5/1974 |
| DE | 29521221 U1 | 3/1997 |
| DE | 10049172 A1 | 4/2002 |
| DE | 10300451 B3 | 1/2004 |
| DE | 102005061099 A1 | 3/2007 |
| DE | 102006024184 A1 | 11/2007 |
| DE | 102007032885 A1 | 1/2009 |
| EP | 2206851 A2 | 7/2010 |
| EP | 2339092 A1 | 6/2011 |
| EP | 2395180 A2 | 12/2011 |
| EP | 3020885 A1 | 5/2016 |
| EP | 2520737 B1 | 3/2017 |
| EP | 3415702 A1 | 12/2018 |
| EP | 3511485 A1 | 7/2019 |
| ES | 2350339 A1 | 1/2011 |
| FI | 21805 A | 1/1947 |
| GB | 0519198 A | 3/1940 |
| JP | 56-009114 A | 1/1981 |
| JP | 62-178654 A | 8/1987 |
| JP | 03-047366 A | 2/1991 |
| JP | 03-055444 U | 5/1991 |
| JP | 06-158831 A | 6/1994 |
| JP | 08-028015 A | 1/1996 |
| JP | 09-038906 A | 2/1997 |
| JP | 10-299231 A | 11/1998 |
| JP | 11-324292 A | 11/1999 |
| JP | 2000-265652 A | 9/2000 |
| JP | 2003-307023 A | 10/2003 |
| JP | 2004-225387 A | 8/2004 |
| JP | 2006-118337 A | 5/2006 |
| JP | 2019-025589 A | 2/2019 |
| RU | 2359093 C2 | 6/2009 |
| WO | 96/06248 A1 | 2/1996 |
| WO | 99/00242 A1 | 1/1999 |
| WO | 01/48333 A1 | 7/2001 |
| WO | 03/87498 A1 | 10/2003 |
| WO | 2009/065769 A2 | 5/2009 |
| WO | 2009/116926 A1 | 9/2009 |
| WO | 2010/081532 A1 | 7/2010 |
| WO | 2011/012104 A2 | 2/2011 |
| WO | 2014/007738 A1 | 1/2014 |
| WO | 2014/136128 A1 | 9/2014 |
| WO | 2014/179437 A1 | 11/2014 |
| WO | 2016/042142 A1 | 3/2016 |
| WO | 2018/068197 A1 | 4/2018 |
| WO | 2018/187329 A1 | 10/2018 |
| WO | 2021/018918 A1 | 2/2021 |

OTHER PUBLICATIONS

International Preliminary Report on Patentability received for PCT Patent Application No. PCT/SE2020/051250, mailed on Jul. 7, 2022, 11 pages.
International Search Report and Written Opinion received for PCT Patent Application No. PCT/SE2020/051250, mailed on Feb. 5, 2021, 18 pages.
Josefsson, Per, et al., U.S. Appl. No. 17/463,902 entitled "Method and Arrangement for Forming Grooves in a Board Element," filed Sep. 1, 2021.
Official Action with Search Report issued in Swedish Patent Application No. 1951558-4, Jul. 20, 2020, PRV Swedish Patents and Reaistration Office, Stockholm, SE, 8 pages.
Official Action with Search Report issued in Swedish Patent Application No. 1951559-2, Aug. 25, 2020, PRV Swedish Patents and Registration Office, Stockholm, SE, 8 pages.
Pervan, Darko (Author), Technical Disclosure entitled "VA073a Zip Loc," IP com No. IPCOM000210869D, Sep. 13, 2011, IP.com Prior Art Database, 36 pages.
Pervan, Darko, U.S. Appl. No. 17/228,240 entitled "Panel Forming," filed Apr. 12, 2021.
U.S. Appl. No. 17/463,902, Per Josefsson, filed Sep. 1, 2021.
U.S. Appl. No. 17/705,465, Per Josefsson, filed Mar. 28, 2022.
U.S. Appl. No. 17/831,826, Per Josefsson, filed Jun. 3, 2022.
U.S. Appl. No. 18/055,473, Per Josefsson, filed Nov. 15, 2022.
U.S. Appl. No. 18/209,359, Per Josefsson, filed Jun. 13, 2023.
U.S. Appl. No. 18/209,667, Per Josefsson, filed Jun. 14, 2023.
U.S. Appl. No. 18/495,918, Per Josefsson, filed Oct. 27, 2023.
U.S. Appl. No. 18/295,559, Darko Pervan, filed Apr. 4, 2023.
U.S. Appl. No. 17/812,281, Darko Pervan, filed Jul. 13, 2022.
U.S. Appl. No. 18/628,988, Per Josefsson, filed Apr. 8, 2024.
U.S. Appl. No. 18/425,012, Per Josefsson, filed Jan. 29, 2024.
U.S. Appl. No. 18/946,258, Per Josefsson, filed Nov. 13, 2024.
U.S. Appl. No. 18/991,969, Darko Pervan, filed Dec. 23, 2024.

* cited by examiner

THERMOPLASTIC-BASED BUILDING PANEL COMPRISING A BALANCING LAYER

CROSS REFERENCE TO RELATED APPLICATIONS

The present application is a continuation of U.S. application Ser. No. 17/130,783, filed on Dec. 22, 2020, which claims the benefit of Swedish Application No. 1951559-2, filed on Dec. 27, 2019, and the benefit of Swedish Application No. 1951558-4, filed on Dec. 27, 2019. The entire contents of each of U.S. application Ser. No. 17/130,783, Swedish Application No. 1951559-2, and Swedish Application No. 1951558-4 are hereby incorporated herein by reference in their entirety.

TECHNICAL FIELD

The disclosure generally relates to balancing of a thermoplastic-based building panel, such as a floor panel. More specifically, the disclosure relates to a thermoplastic-based building panel comprising a balancing layer, wherein the balancing layer is provided between a lower and an upper layer arrangement or wherein the balancing layer is a bottom layer of the building panel. The disclosure also relates to a thermoplastic-based building panel comprising a mechanical locking system for horizontal and/or vertical locking comprising a cooperating surface that is at least partially situated in a balancing layer. Optionally, the building panel may comprise at least one groove.

BACKGROUND

Panels comprising a thermoplastic material, such as Luxury Vinyl Tiles (LVT panels) or Stone Plastic (Polymer) Composite panels (SPC panels) present many advantages, such as high durability and easy maintenance. A typical problem with these types of panels, however, is that they may become too heavy for some applications. Heavy panels may negatively impact their performance as well as their production and transportation costs. Moreover, the transportation and the handling of the panels may become cumbersome. Therefore, there is currently a strong desire to reduce the weight of the panels, e.g., by using less material during manufacturing of the panels or by removing material from the panels after their formation. Less usage of material may also imply substantial cost savings.

WO 2013/032391 and WO 2014/007738 disclose panels comprising a thermoplastic material and being provided with a certain groove structure for decreasing their weight. A similar panel comprising certain grooves 10 in a rear side 5 of the panel 1 is illustrated in a cross-sectional side view in FIG. 1*a*.

An LVT panel or an SPC panel typically has a layered structure, each layer exhibiting a different function. For example, the panel may have a wear layer, a print film and a core. A bottom layer of the panel may be a balancing layer or a backing layer which may ensure that the panel remains sufficiently flat under ambient temperature variations. Typically, the balancing layer mainly comprises a thermoplastic material and a filler. However, the grooves described above may generically have a negative impact on the balancing of the known panels, which indeed may become dimensionally unstable under ambient temperature variations. At least for some panels, a balancing layer completely penetrated by grooves may not contribute sufficiently to the balancing of the panel. As shown in FIG. 1*b*, an unbalanced panel 1 may curl, e.g., such that the front side and the rear side become concave. It is generally desired that the layers of the panel, such as the top layer, the core and the balancing layer, expand and contract substantially in a similar manner such that the panel remain sufficiently flat under temperature variations.

SUMMARY

It is therefore an object of at least embodiments of the present disclosure to provide a thermoplastic-based building panel, such as a floor panel, having a reduced weight and/or a reduced material content with improved balancing properties.

It is also an object of at least embodiments of the present disclosure to provide a thermoplastic-based building panel that is more resistant to curling effects, which may be induced by ambient temperature variations, and/or that is more resistant to indentation effects.

It is also an object of at least embodiments of the present disclosure to provide a more robust and/or stronger mechanical locking system of a thermoplastic-based building panel.

At least some of these and other objects and advantages that will be apparent from the description have been achieved by the various aspects described below.

In accordance with a first aspect of the disclosure, there is provided a thermoplastic-based building panel, such as a floor panel, comprising an upper layer arrangement comprising at least one upper layer, a lower layer arrangement comprising at least one lower layer, and a balancing layer provided between the lower layer arrangement and the upper layer arrangement. The building panel further comprises a groove arrangement comprising at least one groove, preferably a plurality of grooves.

By having a balancing layer that is displaced from a rear side of the building panel, less material or even no material may have to be removed from the balancing layer when providing grooves in the building panel, such as in a bottom portion thereof. Thereby, the balancing layer may remain more intact, and the balancing of the building panel may become improved. Moreover, the curling effect of the building panel may become reduced. Generally in this disclosure, in particular for the first aspect as well as for the second aspect introduced below, the curling and/or the balancing of the panel may be determined by ISO 23999:2018 and/or by utilizing an Indicator Method detailed in an "Examples" section below. The thermoplastic-based panel may be sufficiently balanced up to temperatures of 60° C., or even up to 80° C. An additional advantage of a more intact layer assembly is that the panel may become more resistant to indentation effects. Generally in this disclosure, in particular for the first and second aspects, a residual indentation may be determined by means of the standard ASTM F1914-18 (product specification ASTM F1700).

The building panel, or panel for short, may be a floor panel, a wall panel, a ceiling panel or a furniture panel. In non-limiting examples, the floor panel may be an LVT tile, an SPC panel, an EPC panel (Expanded Polymer Core), or a WPC (Wood Plastic Composite) panel. Moreover, the panel may comprise a pair of opposite edge portions, such as a first pair and a second pair of opposite edge portions. The first pair and the second pair may comprise long edge portions and short edge portions of the panel, respectively.

The panel may comprise a front side and a rear side and may extend in a first X and a second Y horizontal direction, which preferably are perpendicular to each other. In a first example, the first and second horizontal directions extend in parallel with long and short edge portions, respectively. In a second example, the first and second horizontal directions extend in parallel with short and long edge portions, respectively. A vertical direction Z of the panel may be perpendicular to the first and second horizontal directions and may be parallel with a thickness direction of the panel. Thereby, we may refer to elements being arranged "above" or "below" each other. The front side may be adapted to be visible and, at least in some embodiments, such as for a floor panel, the rear side may be adapted to be concealed in an installed state of the panel. Indeed, a set of building panels, such as floor panels, may be installed on a substructure, such as a subfloor.

The at least one groove may have a longitudinal extension and a transverse extension. The longitudinal extension may be larger than the transverse extension. In a first example, the longitudinal and the transverse extensions may be parallel to a long and a short edge portion, respectively. In a second example, the longitudinal and the transverse extensions may be parallel to a short and a long edge portion, respectively.

The upper layers may be laminated to each other and/or bonded to each other by an adhesive. Likewise, the lower layers may be laminated to each other and/or bonded to each other by an adhesive. The upper and/or the lower layer arrangement may be laminated to the balancing layer and/or bonded thereto by an adhesive. Any of said layers or layer arrangements herein may be laminated to each other under heat and pressure. In the second aspect introduced below, reference will typically be made only to an upper layer arrangement and not a lower layer arrangement.

The groove arrangement may be provided in the lower layer arrangement.

The at least one groove may be provided in a rear side of the lower layer arrangement, preferably in a bottom layer thereof.

The groove arrangement may be post-formed after forming the panel per se, preferably by removing material from a bottom layer, such as a lower layer, of the panel. An ordinarily skilled artisan will appreciate that, within the scope of the present disclosure, the concept of being "post-formed" includes the case when the groove arrangement is post-formed after forming a board per se and thereafter dividing the board into at least one panel, such as a plurality of panels. Preformed grooves are equally conceivable.

The at least one groove may be tapering towards a depth direction of the grooves, which may be parallel with the vertical direction of the panel. Generally, an inner portion of the grooves may be curved or planar.

In some embodiments, each of the at least one groove may be an internal groove provided within the lower layer arrangement, such as in a bottom layer thereof. Thereby, an internal groove may have walls within the panel along one horizontal direction and along the vertical direction. The internal groove may be open towards the other horizontal direction.

A groove depth, preferably a maximal groove depth, of the at least one groove may be larger than 20%, such as larger than 30% or larger than 40%, of a thickness of the lower layer arrangement and/or of a thickness of the building panel, such as floor panel.

Generally, the balancing layer may be at least partly provided above the groove arrangement, such as entirely above the groove arrangement.

A major portion of the grooves may be provided entirely below the balancing layer. Thereby, a major portion of the grooves do not extend into, such as penetrate, the balancing layer. For example, the grooves may penetrate the lower layer arrangement only.

Generally herein, the major portion of the grooves may comprise a major portion of a total volume of the grooves and/or a major portion of a total number of grooves. Hence, a major portion of the total volume of the grooves and/or a major portion of the total number of grooves may be provided entirely below the balancing layer.

The major portion may be at least 50% of the number of grooves and/or at least 50% of the total volume of the grooves. When the grooves are provided in the rear side, the total volume of the grooves may be a volume occupied by the grooves within the panel and being limited by a horizontal plane HP provided along the rear side. When the grooves are internal grooves, the total volume of the grooves may be a volume occupied by the grooves within the panel and being limited by a vertical plane VP, preferably provided along the edge portions.

In some embodiments, an average groove depth of a plurality of grooves may be smaller than a thickness of the lower layer arrangement. Hence, an average value of an innermost portion of the grooves along the vertical direction may be provided below the balancing layer. These embodiments provide examples of the major portion of the grooves being provided entirely below the balancing layer.

In some embodiments, all grooves are provided entirely below the balancing layer.

The building panel may comprise a plurality of grooves in the lower layer arrangement, wherein an innermost portion of at least one groove is separated from the balancing layer by a distance in the vertical direction of the building panel. Thereby, the lower layer arrangement may be continuous, which may improve the balancing of the panel. For example, there may be a distance between each of the plurality of grooves and the balancing layer. The distance may be at least 0.3 mm, such as at least 1 mm. Preferably, the distance is non-negative, although in alternative embodiments the distance between the grooves and the balancing layer is negative, such that the grooves extend through the balancing layer. The distance may be larger than 0.25 times a thickness of an uppermost layer of the upper layer arrangement, preferably larger than 0.50 times or larger than 1.0 times the thickness of the uppermost layer. For example, the uppermost layer may be a wear layer.

A combined thickness, such as a maximal combined thickness, of the lower layer arrangement and the balancing layer, may be at least 20%, such as at least 35% or at least 50%, of a thickness of the building panel.

A thickness of the balancing layer may be smaller than a groove depth, preferably a maximal groove depth, of the at least one groove.

Generally herein, the maximal groove depth of a groove may be a distance from the rear side of the building panel to the innermost portion of the groove. The groove depth may be a distance along the vertical direction of the building panel. Moreover, for an internal groove, the maximal groove depth may be a maximal vertical distance between walls of the internal groove.

A thickness, such as a maximal thickness, of the balancing layer may be at least 5%, such as at least 10% or at least 20%, of a thickness of the building panel. In some embodiments, the thickness of the balancing layer may even be at least 30% of the thickness of the building panel.

A thickness, such as a maximal thickness, of the balancing layer may be larger than a thickness of an upper layer of the upper layer arrangement, wherein the upper layer preferably is an uppermost layer of the upper layer arrangement. For example, the uppermost layer may be a wear layer. Thereby, an improved balancing of the panel may be provided. A thickness, such as a maximal thickness, of the balancing layer, may have at least the same thickness as the uppermost layer, preferably being larger. In some embodiments, a thickness, such as a maximal thickness, of the balancing layer may be at least 5 times or at least 10 times, a thickness, such as a maximal thickness, of the uppermost layer, such as a wear layer.

In accordance with a second aspect of the disclosure, there is provided a thermoplastic-based building panel, such as a floor panel, comprising an upper layer arrangement comprising at least one upper layer, and a balancing layer which is a bottom layer of the building panel. The building panel further comprises a groove arrangement comprising at least one groove, preferably a plurality of grooves, wherein a major portion of the grooves are provided in the balancing layer only.

In accordance with the second aspect, a major portion of the grooves does not penetrate into other layers of the building panel and the balancing layer may remain more intact. Thereby, an improved balancing of the panel may be provided. Moreover, the curling effect of the building panel, such as induced by ambient temperature variations, may become reduced. Incidentally, it is noted that a minor portion of the grooves may optionally penetrate into the upper layers of the building panel.

Generally herein, a minor portion and the major portion may jointly correspond to all of the grooves, such as the total number of grooves and/or the total volume of the grooves.

The upper layers may be laminated to each other and/or bonded to each other by an adhesive. The upper layer arrangement may be laminated to the balancing layer and/or bonded thereto by an adhesive.

In some embodiments, all of the grooves are provided in the balancing layer only. Thereby, the bottom layer may be continuous, without any grooves penetrating both a lower side and an upper side thereof.

A groove depth, preferably a maximal groove depth, of the groove(s) may be larger than 20%, such as larger than 30% or larger than 40%, of a thickness of the balancing layer and/or of a thickness of the building panel, such as floor panel.

In some embodiments, an average groove depth of a plurality of grooves may be smaller than a thickness of the balancing layer. Hence, an average value of an innermost portion of the grooves along the vertical direction may be provided below the upper layer arrangement. These embodiments provide examples of the major portion of the grooves being provided entirely below the upper layer arrangement.

The grooves may be provided in a rear side of the balancing layer.

In some embodiments, each of the at least one groove may be an internal groove provided at least partially, preferably completely, within the balancing layer. Thereby, an internal groove may have walls within the panel along one horizontal direction and along the vertical direction of the panel. The internal groove may be open towards the other horizontal direction.

The major portion may comprise a major portion of a total volume of the grooves and/or a major portion of a total number of grooves. In some embodiments, the major portion of the grooves may comprise a major portion of a groove depth. Hence, a major portion, such as at least 50%, of the innermost portions of the grooves may be provided entirely below the balancing layer.

The major portion may be at least 50% of the number of grooves and/or at least 50% of the total volume of the grooves. In some embodiments, the total volume of the grooves may be at least 60% or at least 70% of the total volume of the grooves. Embodiments of the total volume of the grooves have been described in relation to the first aspect, whereby reference is made thereto by analogy. The major portion of the total number of the grooves may be more than 50% of the total number of grooves. In non-limiting examples, a major portion of 11 grooves is at least 6 grooves and a major portion of 14 grooves is at least 8 grooves. The embodiments relating to a "major portion" are valid also for the first aspect by analogy.

A thickness, such as a maximal thickness, of the balancing layer may be larger than a thickness of an upper layer of the upper layer arrangement, wherein the upper layer preferably is an uppermost layer of the upper layer arrangement. For example, the uppermost layer may be a wear layer. A thickness, such as a maximal thickness, of the balancing layer, may be at least 4 times, such as at least 10 times or at least 20 times, a thickness, such as a maximal thickness, of the uppermost layer, such as a wear layer.

A thickness, such as a maximal thickness, of the balancing layer may be at least 20%, such as at least 35% or at least 50%, of a thickness of the building panel. Such a relatively thicker balancing layer may require more material content and may become more costly. However, by using a recyclable material, such as a thermoplastic polymer, in the balancing layer, material that is removed or saved when forming the grooves may be recycled or reused. Hence, the cost, such as a total production cost of several panels, may effectively be reduced.

The building panel may comprise a plurality of grooves in the balancing layer, wherein an innermost portion of at least one groove is separated from the upper layer arrangement by a distance in the vertical direction of the building panel. Thereby, the balancing layer may be continuous, which may improve the balancing of the panel. For example, each of the plurality of grooves may be separated from the upper layer arrangement. The distance may be at least 0.3 mm, such as at least 1 mm. The distance may be larger than 0.25 times a thickness of an uppermost layer of the upper layer arrangement, preferably larger than 0.50 times or larger than 1.0 times the thickness of the uppermost layer. For example, the uppermost layer may be a wear layer.

It is emphasized that the following embodiments are conceivable for a panel in accordance with any of the first and second aspects.

In some embodiments, a groove depth of a plurality of grooves may be essentially the same.

The building panel may comprise a plurality of grooves, wherein a groove depth, preferably a maximal groove depth, of at least two grooves are different.

In some embodiments, the groove arrangement may comprise a calibrating groove, for example as described in WO 2014/182215, page 2, lines 13-22 which hereby is incorporated by reference in its entirety.

Generally, the balancing layer may be a discontinuous layer. Thereby, the balancing layer may be fully penetrated, such as by at least one groove or even all grooves. Such a panel may be less balanced compared to a panel where the balancing layer is continuous, but may be sufficiently balanced for some applications. Optionally, the panel in such embodiments may comprise a reinforcement element, see the discussion below.

The balancing layer may be a continuous layer. According to this embodiment, the balancing layer is not fully penetrated, such as by the grooves. Thereby, the panel may become better balanced. In a first example, the balancing layer has a substantially constant thickness, optionally comprising internal grooves. In a second example, the balancing layer has a varying thickness along a first and/or a second horizontal direction of the building panel. The varying thickness may result from grooves being provided at least partly in the balancing layer.

The building panel may comprise at least one reinforcement element, such as at least one glass-fibre layer. The upper and/or lower layer arrangement may comprise a reinforcement element, such as a glass-fibre layer. Moreover, the balancing layer may comprise a reinforcement element, such as a glass-fibre layer. In some embodiments, the reinforcement element may contribute to the balancing of the panel.

The at least one reinforcement element may be provided in a centre portion of the building panel, wherein the centre portion is provided between an innermost portion of the grooves and the front side in the vertical direction of the panel. The centre portion may be provided at a distance from the front side of between 35% and 65% of a distance between the innermost portion and the front side.

The building panel, such as a floor panel, may further comprise a mechanical locking system in an edge portion or edge portions for horizontally and/or vertically locking the building panel to an adjacent building panel or adjacent building panels. The panel may comprise a mechanical locking system on the long edge portions and/or on the short edge portions.

In some embodiments, the building panel is not provided with any mechanical locking system. Instead, the panel may be embodied as a floor panel which may be configured to be installed loosely on a subfloor or it may be embodied as a building panel, such as a floor panel, configured to be nailed or glued to a substructure, such as a subfloor.

Embodiments of the mechanical locking system of the first or the second aspect may be implemented in accordance with any embodiment described herein in relation to the third aspect.

Generally herein, a panel thickness may be 2-40 mm, such as 2-10 mm or 3-6 mm. For example, when the thickness of the lower layer arrangement in the first aspect or the balancing layer in the second aspect is 2-30 mm, a groove depth of any of the grooves may be at least 0.5-10 mm. For example, a floor panel having a thickness of 2-10 mm may have groove depth which is at least 0.5-5 mm.

It is noted that in any of the first and second aspects, a separately formed underlay element may at least partially, preferably entirely, cover the rear side of the panel. The underlay element may be a foam, such as irradiated cross-linked polyethylene foam (IXPE) or Ethylene Vinyl Acetate foam (EVA), or cork. The underlay element may be bonded to the rear side by an adhesive according to principles known in the art.

In accordance with a third aspect of the disclosure, there is provided a thermoplastic-based building panel, such as a floor panel, comprising an upper layer arrangement and/or a lower layer arrangement, a balancing layer comprising a thermoplastic polymer, and a mechanical locking system for horizontally and/or vertically locking the building panel to an adjacent building panel. The mechanical locking system comprises a cooperating surface provided in an edge portion of the building panel and being configured to cooperate with a cooperating surface of the adjacent building panel, wherein the cooperating surface of the mechanical locking system is at least partially situated in the balancing layer.

For many thermoplastic-based panels, a part of the mechanical locking system may be the weakest part of the panel, for example when subject to high stress, e.g., when conducting a high-load test, a locking strength test or a Castor chair test, or during installation of the panels. A mechanical locking system in accordance with the third aspect may become more robust and/or stronger. For example, the risk of damaging, e.g., cracking, a part of the mechanical locking system may be reduced.

The cooperating surfaces, such as locking surfaces and/or guiding surfaces, may cooperate by direct engagement or indirectly. In any embodiment described herein, there may be a sealing agent, such as a wax or an adhesive, provided between the cooperating surfaces, thereby providing examples of an indirect engagement.

The cooperating surface may be a horizontal and/or vertical cooperating surface for horizontal and/or vertical cooperation, such as locking to the adjacent panel and/or guiding of the adjacent panel.

The balancing layer may be provided between the lower layer arrangement and the upper layer arrangement. Embodiments and examples may be the same as those of the first aspect, whereby reference is made thereto.

The balancing layer may be a bottom layer of the building panel. Embodiments and examples may be the same as those of the second aspect, whereby reference is made thereto.

The balancing layer may at least partially extend through a locking element provided on a strip and/or through a locking groove, wherein the locking element is configured to engage with a locking groove of the adjacent building panel for horizontal locking. The strip may extend horizontally beyond an upper edge of the edge portion. Generally, the upper edges of the panels may be juxtaposed in a locked state of the panels. When a normal of surface portions of the upper edges are arranged perpendicularly to a normal of the front and/or rear sides of the panels, they may define a vertical plane VP, preferably having a normal being parallel with the normal of the surface portions.

The balancing layer may at least partially extend through an upper portion, an inner wall and/or an outer wall of the locking element and/or through an upper wall, an inner wall and/or an outer wall of the locking groove, Generally herein, the edge portion may be a short edge portion and/or a long edge portion.

The cooperating surface may be situated on the locking element and/or in the locking groove, for example at least partially in the balancing layer.

An uppermost surface of the locking element may comprise a portion of the balancing layer, wherein the cooperating surface preferably is provided in the uppermost surface.

The balancing layer may at least partially extend along a strip, such as along an upper portion of the strip. The strip may be embodied as described above.

An uppermost surface of the strip, for example provided horizontally inwardly of the locking element, may comprise a portion of the balancing layer. The cooperating surface may be provided in the uppermost surface.

A transitional surface transitioning from the uppermost surface of the strip to the locking element, such as an inner wall of the locking element, may comprise a portion of the balancing layer. Thereby, the mechanical locking system may become stronger and/or more robust, for example when subject to high stress, e.g., when conducting a locking strength test, or during installation of the panels. Indeed, a region around the transitional surface may be exposed to particularly high stresses, especially on a short edge portion.

Optionally, the transitional surface may comprise a portion of the uppermost surface of the strip and/or a portion of the inner wall of the locking element.

The balancing layer may at least partially extend through a tongue portion, such as through a lower portion of the tongue portion, wherein the tongue portion is configured to engage with a tongue groove of the adjacent building panel for vertical locking.

The tongue portion may comprise a tongue that is integrally formed with the panel.

The tongue portion may comprise a separate, and preferably flexible, tongue that is configured to be provided in a displacement groove provided at an edge portion of the panel, preferably a short edge portion.

The cooperating surface may be at least partially provided in a wall of the tongue groove, such as in at least one of an upper wall, a lower wall and an inner wall of the tongue groove.

The cooperating surface may be situated on the tongue portion.

A lowermost surface of the tongue portion may comprise a portion of the balancing layer, wherein the cooperating surface preferably is provided in the lowermost surface.

The cooperating surface may be a first cooperating surface provided in a first edge portion of the building panel and the mechanical locking system may further comprise a second cooperating surface provided in a second edge portion of the building panel, the first and second edge portions preferably being oppositely arranged on the building panel, wherein the second cooperating surface is at least partially situated in the balancing layer.

Generally, the first and second cooperating surfaces may be arranged to cooperate with a corresponding second and first cooperating surface of a respective adjacent building panel. The cooperating surface of the adjacent building panel may be a general cooperating surface. Optionally, however, the cooperating surface of the adjacent building panel may be at least partially situated in the balancing layer of the adjacent building panel.

The cooperating surface may be a locking surface configured to engage with a locking surface of the adjacent building panel in a locked state of the building panel and the adjacent building panel. The locking surfaces may engage for vertical and/or horizontal locking. Hence, the locking surfaces may be vertical locking surfaces and/or horizontal locking surfaces. The locking surface of the adjacent building panel may be a general locking surface. Optionally, however, the locking surface of the adjacent building panel may be at least partially situated in the balancing layer of the adjacent building panel.

The cooperating surface may be a guiding surface configured to guide the adjacent building panel during locking of the building panel to the adjacent building panel, such as by cooperating or engaging with a cooperating surface, such as a guiding surface, of the adjacent building panel during locking. The guiding surface may guide the adjacent panel vertically and/or horizontally. The cooperating surface, such as a guiding surface, of the adjacent building panel may be a general cooperating surface. Optionally, however, the cooperating surface of the adjacent building panel may be at least partially situated in the balancing layer of the adjacent building panel.

The adjacent building panel may be configured to be angled downwards and/or displaced vertically downwards towards the building panel during locking. Alternatively, however, the building panel may be configured to be angled downwards and/or displaced vertically downwards towards the adjacent building panel during locking. Indeed, an ordinarily skilled artisan will appreciate that, within the scope of the present disclosure, the roles of the building panel and the adjacent building panel described herein may be interchanged. For example, the features of the cooperating surfaces, such as the locking surfaces and/or guiding surfaces, may be interchanged. In particular, the adjacent building panel may comprise a mechanical locking system for horizontally and/or vertically locking the adjacent building panel to a building panel, the mechanical locking system comprising a cooperating surface provided in an edge portion of the adjacent building panel and being configured to cooperate with a cooperating surface of the building panel. The cooperating surface may be at least partially situated in the balancing layer of the adjacent building panel. For simplicity, however, reference will often be made only to a cooperating surface being at least partially situated in the balancing layer of the building panel.

In some embodiments, the cooperating surface may be a locking surface as well as a guiding surface.

The building panel may further comprise a groove arrangement comprising at least one groove, preferably a plurality of grooves. The grooves may be embodied as in any of the first or second aspects, whereby reference is made thereto.

When the panel is subject to high stress and/or is largely curled, an inner portion of the grooves may be the weakest portion of the panel. By having a layer, such as a lower layer or a balancing layer, comprising a thermoplastic polymer, the inner portion may be more flexible and/or less brittle. As a result, the inner portion, and hence the panel as a whole, may become more resistant to high stress.

Other embodiments and examples of the building panel in accordance with the third aspect may be largely analogous to those of the first or the second aspect, whereby reference is made to the above. In particular, embodiments and examples of at least one selected from the group of the grooves, the upper and/or the lower layer arrangements, the balancing layer and the thicknesses may be the same. It is emphasized, however, that a groove arrangement is optional for the building panel in accordance with the third aspect.

It is stressed that the following embodiments relating to the material composition and properties of the balancing layer as well as the upper and/or the lower layer arrangement are applicable for each of the first, second and third aspects.

The upper layer arrangement, such as each of the at least one upper layer, may comprise a thermoplastic polymer and, optionally, a filler.

The upper layer arrangement may comprise a wear layer and/or a print layer, such as a print film. Preferably, the wear layer is an uppermost layer. The print layer may be provided below the wear layer. It is understood that, generally, a coating, such as a UV curable coating, may be provided on the upper layer arrangement, such as on the uppermost layer, preferably being a wear layer. For sake of clarity, such a coating will often be left out in this disclosure, but may be implicitly understood to be included.

The balancing layer may comprise a thermoplastic polymer and, optionally, a filler.

The lower layer arrangement, such as each of the at least one lower layer, may comprise a thermoplastic polymer and, optionally, a filler.

The thermoplastic polymer of the upper and/or the lower layer arrangement may comprise polyvinyl chloride (PVC), polyethylene (PE), polyethylene terephthalate (PET), polypropylene (PP), acrylonitrile butadiene styrene (ABS) or thermoplastic polyurethane (TPU). Additionally, or alternatively, the balancing layer may comprise PVC, PE, PET, PP, ABS or TPU. For example, the amount of the thermoplastic polymer in each upper and/or lower layer and/or the balancing layer may be 10-70 wt %, such as 20-50 wt %.

Generally, a filler of the upper and/or lower layer arrangement and/or of the balancing layer may comprise an organic filler and/or an inorganic filler. The filler may be a functional filler and/or an extender. The inorganic filler may be a mineral material, such as calcium carbonate ($CaCO_3$) or stone material, such as stone powder, or similarly. The organic filler may be organic fibers, e.g., wood flour or rice husks. The filler may also be a clay material, such as kaolin. For example, the amount of filler in each upper and/or lower layer and/or the balancing layer may be 20-90 wt %, such as 40-80 wt %.

Optionally, any, a pair, or each of the upper layer arrangement, the lower layer arrangement and the balancing layer may comprise a plasticizer and/or additives, such as a stabilizer, an impact modifier, a pigment, or a lubricant. Yet optionally, the upper and/or lower layer arrangement may comprise a foaming agent. Generally, the panel may be a resilient panel or a rigid panel, for example by virtue of comprising a plasticizer and by not comprising any plasticizer, respectively. Similarly, the upper or lower layer(s), or the balancing layer, may be resilient or rigid, for example depending on the presence of a plasticizer. In a preferred embodiment, the balancing layer may be resilient, thereby comprising a plasticizer. Thereby, the balancing property of the panel may be strengthened.

Generically herein, the concept of "material composition" may include at least one of an amount and a type of a thermoplastic polymer, an amount and a type of a filler, an amount and a type of plasticizer and/or additives, etc.

At least two layers of the panel, such as at least one upper layer and/or at least one lower layer, may have the same material compositions.

In some embodiments, the upper layer(s) and the balancing layer, as well as the lower layer(s) in the first aspect, may comprise different material compositions. For example, each upper layer, the balancing layer, as well as the lower layer(s) in the first aspect, may comprise a thermoplastic polymer and, preferably, a filler.

In some embodiments of the first aspect, an upper layer and a lower layer may comprise a substantially similar material composition. For example, the upper layer and the lower layer may comprise a thermoplastic polymer and preferably a filler.

In some embodiments of the first and the second aspects, an upper layer and the balancing layer may comprise a substantially similar material composition. For example, the upper layer and the balancing layer may comprise a thermoplastic polymer and preferably a filler.

An amount of a thermoplastic polymer in the balancing layer may be higher than an amount of a thermoplastic polymer in the upper and/or lower layer arrangement. For example, the amounts may be specified in weight percentages or volume percentages or, for example when the thermoplastic polymer is PVC, in parts per hundred of PVC resin (PHR). Optionally, an amount of a filler, such as a mineral filler, in the balancing layer may be lower than an amount of a filler in the upper and/or lower layer arrangement. By this embodiment, the balancing layer may become less brittle and/or more flexible. Moreover, a strength, such as a tensile strength, of the balancing layer may become higher. This may be advantageous, e.g., when the cooperating surface is at least partially situated in the balancing layer in accordance with the third aspect. For example, the mechanical locking system may become even stronger and/or more robust. It is noted that a lower degree of a filler in a layer, especially a mineral filler, may make the layer less brittle.

An amount of a thermoplastic polymer in the balancing layer may be higher than an amount of a thermoplastic polymer in each of the upper and/or lower layers. Generally herein, the panel may comprise an upper and a lower layer arrangement (first aspect), an upper layer arrangement (second aspect), or any combination of upper and/or lower layer arrangement(s) (third aspect). Optionally, an amount of a filler, such as a mineral filler, in the balancing layer may be lower than an amount of a filler in each of the upper and/or lower layers.

Generally, a first layer of the panel comprising a higher amount of a thermoplastic polymer, such as a wear layer or a balancing layer, and optionally a lower amount of a filler, than a second layer of the panel, may contribute more to the curling of the panel, e.g., since a thermoplastic polymer, such as PVC, may have a much higher coefficient of linear thermal expansion compared to a filler, such as $CaCO_3$. For example, the first layer may be the balancing layer or a wear layer and the second layer may be an upper or a lower layer.

At least one upper and/or lower layer of the building panel may be extruded, such as coextruded. Preferably, each extruded or coextruded layer comprises a thermoplastic polymer.

The balancing layer may be extruded per se, or it may be coextruded with at least one upper and/or lower layer. For example, the panel may comprise an AB, ABA or ABC coextruded layer element comprising two or three layers. The balancing layer may be provided between an upper layer and a lower layer in an ABA or ABC coextruded layer element. Here, the same letter (A) and different letters (A, B or C) refer to the layers having substantially the same material composition and different material compositions, respectively.

In some embodiments, the upper and/or the lower layer arrangement may comprise a non-polymeric layer. In a first example, a veneer may be bonded to an upper layer, which preferably is a layer comprising a thermoplastic polymer, and preferably a filler. In a second example, a paper, preferably a melamine-formaldehyde impregnated paper, may be bonded to an upper layer, which preferably is a layer comprising a thermoplastic polymer, and preferably a filler.

In accordance with a fourth aspect of the disclosure, there is provided a panel assembly comprising a building panel and an adjacent building panel. The building panel and/or the adjacent building panel may be embodied as the building panel according to any of the embodiments and examples of the first, second and third aspects, whereby reference is made thereto.

Further aspects of the disclosure and embodiments and examples of each of the first, second, third and fourth aspects are provided in an illustrative embodiment section below. It is emphasized that the embodiments and examples of any aspect may be combined with embodiments and examples of any other aspect.

Generally, all terms used in the claims and items are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The disclosure will in the following be described in connection to exemplary embodiments and in greater detail with reference to the appended exemplary drawings, wherein.

DETAILED DESCRIPTION

Figure 1A:
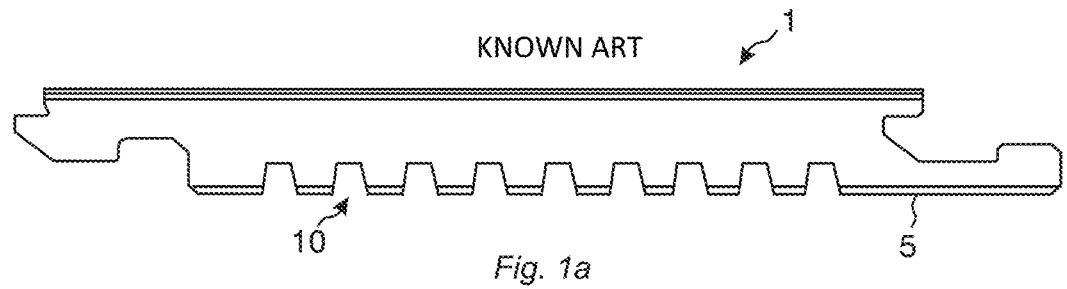
FIGS. 1a-1b illustrate in cross-sectional side views an embodiment of a floor panel comprising grooves according to known art and an embodiment of a curled floor panel.
Figure 1B:
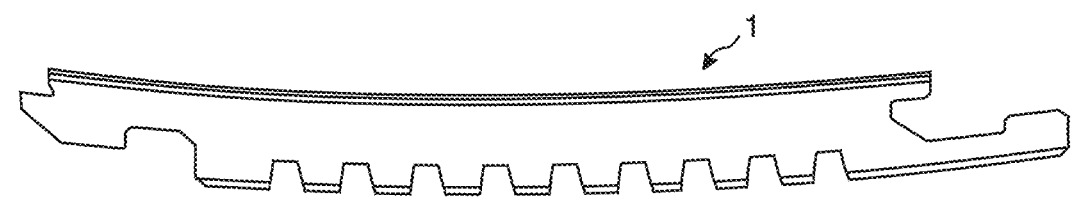

The various aspects of the disclosure will hereinafter be described with respect to a thermoplastic-based floor panel, but an ordinarily skilled artisan will appreciate that, within the scope of the present disclosure, they are applicable for a general building panel, such as a wall panel, a ceiling panel or a furniture panel. Therefore, in the following, reference will often be made simply to a panel.

FIGS. 1c-1e, 2a-2d, 5a, 5c, 6a-6c, 7a-7c, 8a-8b, 8d and 9a, illustrate embodiments of a thermoplastic-based panel 1 in the form of a floor panel according to the first aspect. The panel comprises an upper layer arrangement 2, a lower layer arrangement 3, and a balancing layer 4 provided between the lower and the upper layer arrangement. Generally, the upper layer arrangement comprises at least one upper layer 2a, 2b, 2c and the lower layer arrangement comprises at least one lower layer 3a, 3b. A groove arrangement 10 comprising at least one groove 11, preferably a plurality of grooves, is provided in the lower layer arrangement 3.

The upper layer arrangement 2 may comprise a wear layer and/or a print layer. The wear layer may be the uppermost layer 2a.

In some embodiments, the upper 2 and/or the lower 3 layer arrangement may be laminated to the balancing layer 4. In turn, at least some upper layers and/or lower layers may be laminated to each other. For example, the upper layer(s), the lower layer(s), and the balancing layer may be provided as sheets or may be provided on rolls and may be laminated to each other under heat and pressure. The sheets may be stacked on top of each other and, for example, may be laminated to each other in a hot press or a multi-daylight static press. The layers provided on rolls may be laminated to each other in a continuous process. In some embodiments, the balancing layer may be (co-)extruded with at least one upper and/or lower layer, such as with all upper and lower layers except for the wear layer and/or the print layer.

As shown in, e.g., the embodiments in FIGS. 1c-1e, 2a-2d, 6a-6c and 7a, the grooves 11 may be provided in a rear side 5 of the lower layer arrangement 3, preferably in a bottom layer 5' thereof. For example, the grooves may be post-formed after forming the panel per se by removing material from the bottom layer 5', such as by rotating saw blades, cutting, milling, scraping or carving. Alternatively, the grooves may be pre-formed while forming the panel, such as during heating and pressing of the panel.

Figure 5A:
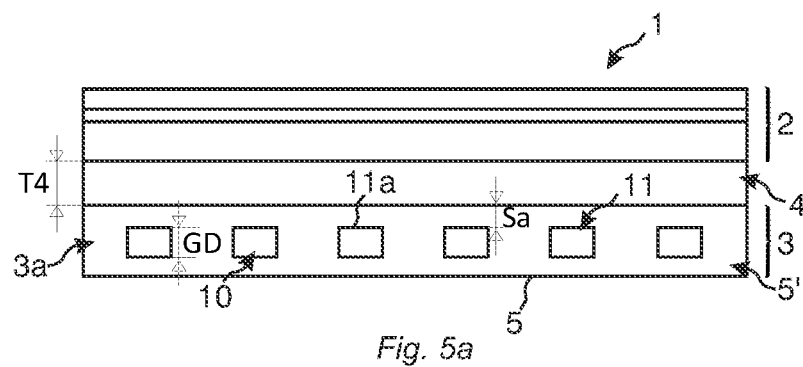
FIGS. 5a-5d illustrate exemplary embodiments of a building panel according to the first and second aspects in cross-sectional side views (FIGS. 5a-5b) and in a perspective view (FIG. 5c) as well as an embodiment of a lower layer arrangement in a cross-sectional side view (FIG. 5d).
Figure 5B:
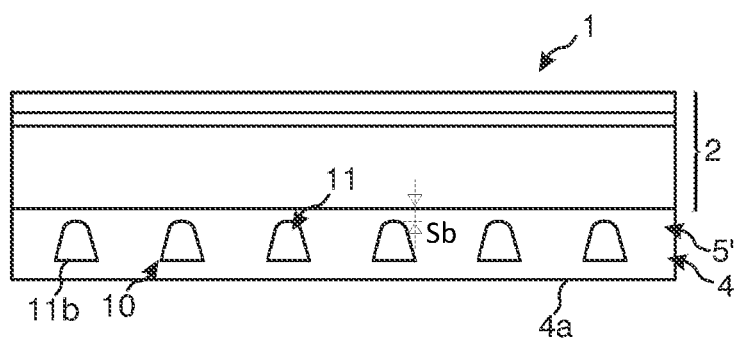
Figure 5C:
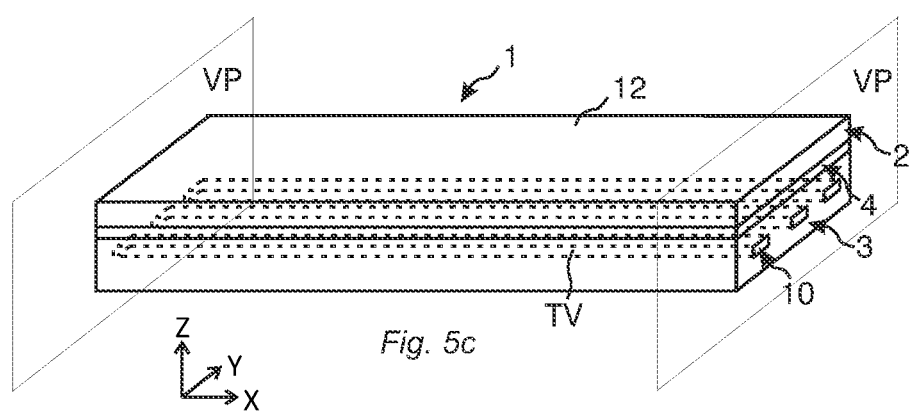

However, as shown in the embodiment in FIGS. 5a and 5c, it is conceivable that the grooves may be provided within the lower layer arrangement, such as in a bottom layer 5' thereof. In an illustrative embodiment, the grooves are bounded by a panel portion located below grooves. Alternatively, the grooves may include an opening at a bottom-facing surface of the panel 1. For example, these internal grooves 11 may be pre-formed in the lower layer arrangement, such as being formed during manufacturing of the lower layer arrangement and/or the panel, e.g., by (co-)extrusion. The internal grooves 11 may have walls within the panel along one horizontal direction, such as the second horizontal direction Y shown in FIG. 5c, and a vertical direction Z of the panel. Generally herein, a thickness direction may be parallel with the vertical direction Z of the panel. The internal grooves may be open towards the other horizontal direction, such as the first horizontal direction X shown in FIG. 5c. Thereby, the internal grooves may extend all the way the edge portions, such as the short edge portions.

The balancing layer 4 may be at least partly provided above the groove arrangement 10. Thereby, the balancing layer may be continuous. This is illustrated, e.g., in the embodiments in FIGS. 1c, 1e, 2a, 2c-2d, 5a, 5c, 6b-6c and 7a. As also shown in some of these figures, the balancing layer 4 may be provided entirely above the groove arrangement.

Figure 2A:
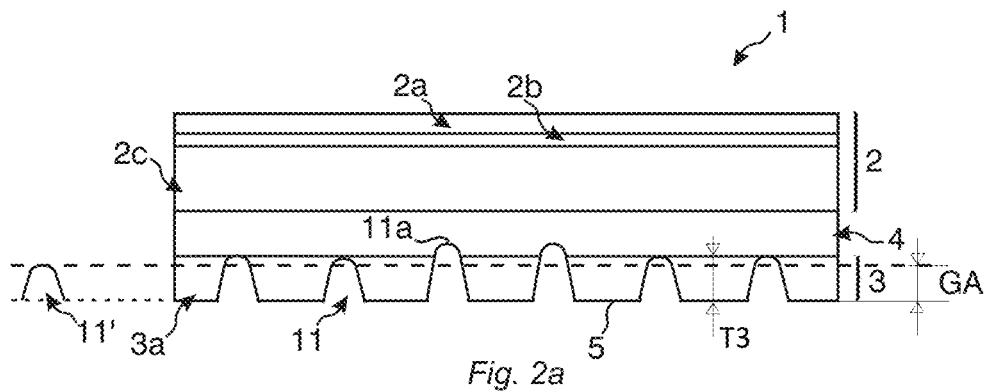
FIGS. 2a-2d illustrate exemplary embodiments of a building panel according to the first aspect in cross-sectional side views.
Figure 2B:
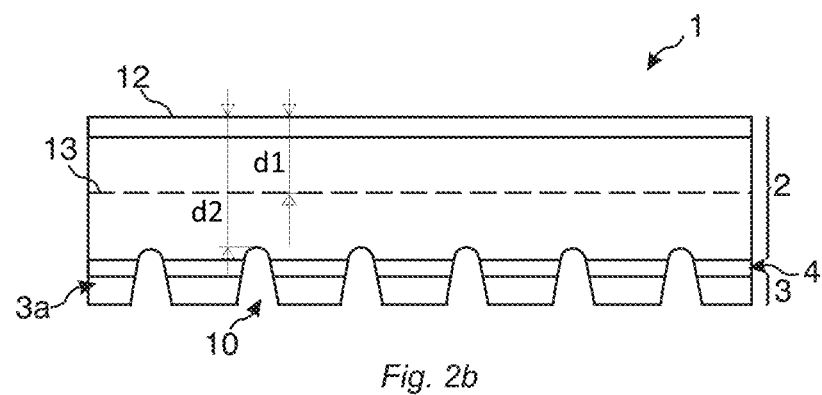
Figure 2C:
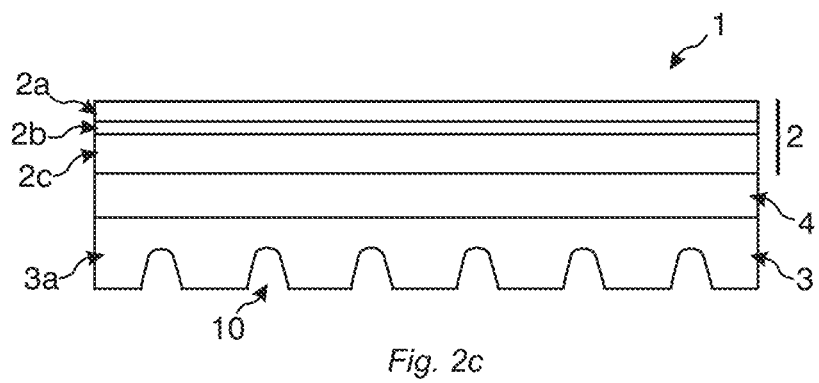

It is also conceivable that all grooves 11 entirely penetrate the balancing layer as shown in the embodiment in FIG. 2b, such that the balancing layer 4 becomes discontinuous.

However, such a panel 1 may be less balanced compared to a panel where the balancing layer is at least partly provided above the groove arrangement. Nevertheless, such a panel may be sufficiently balanced for some applications. For example, a reinforcement element 13 may be provided therein as described below.

As shown, e.g., in the embodiments in FIGS. 1c, 1e, 2c-2d, 5a, 5c and 6b-6c, the balancing layer 4 may have a substantially constant thickness T4, preferably by having a panel wherein all grooves are provided entirely below the balancing layer. The grooves may penetrate the lower layer arrangement 3 only.

It is also conceivable that the balancing layer 4 may have a varying thickness T4 along a first X and/or a second Y horizontal direction of the panel. For example, as shown in, e.g., FIGS. 2a-2b and 7a, grooves 11 may be provided at least partly in the balancing layer 4, thereby providing a varying thickness along the second horizontal direction Y. A major portion of the grooves may be provided entirely below the balancing layer as shown in, e.g., FIG. 2a. Optionally, the thickness may vary also along the first horizontal direction X, e.g., by having grooves provided inside the edge portions of the panel along the first horizontal direction X. This is conceivable for any of the embodiments in, e.g., FIGS. 1c-1e, 2a-2d, 6a-6c and 7a-7c.

The major portion may be at least 50% of the number of grooves and/or at least 50% of the total volume TV of the grooves. The total volume TV of the grooves 11 provided in the rear side 5 may be a volume occupied by the grooves within the panel, e.g., defined by internal walls 11b of the grooves, and being limited by a horizontal plane HP provided along the rear side, see, e.g., FIG. 6b. The total volume TV of internal grooves 11 may be a volume occupied by the grooves within the panel, e.g., defined by internal walls 11b of the grooves, and being limited by a vertical plane VP provided along the edge portions where the internal grooves are open, see, e.g., FIG. 5c.

Generally, a groove depth GD of the grooves 11 may be larger than 20%, such as larger than 30% or even larger than 40%, of a thickness T3 of the lower layer arrangement 3. In some embodiments, the groove depth GD may be larger than 20%, such as larger than 30% or larger than 40%, of a thickness T1 of the panel.

As shown in the embodiments in FIGS. 1e, 2c-2d, 5a, 5c, 6b-6c and 7a, an innermost portion 11a of one or several of a plurality of grooves 11 may be separated from the balancing layer 4 by a distance Sa in a vertical direction Z of the panel. In some embodiments, and as shown in FIG. 2a for a pair of transversely outermost grooves, but is clearly conceivable for any, some or each of the grooves, the distance Sa may be vanishing (Sa=0). Optionally, the balancing layer 4 may be exposed from below when Sa=0. In some embodiments, the distance Sa may be larger than 0.25 times a thickness TU of an uppermost layer 2a, such as a wear layer. Preferably, however, the distance is larger than 0.50 times or even larger than 1.0 times the thickness TU of the uppermost layer 2a.

As illustrated in, e.g., FIG. 2a, but which may be applied for any embodiment of the first aspect, such as in FIGS. 1c-1e, 2c-2d, 5a, 5c, 6a-6c and 7a, an average groove depth GA of the grooves 11 may be smaller than the thickness T3. An average-depth groove 11' is schematically illustrated in FIG. 2a.

Generally for the first aspect, the thickness T4 of the balancing layer 4 may be at least 5%, such as at least 10% or at least 20%, of the thickness T1 of the panel. Alternatively, or additionally, a combined thickness TL of the lower layer arrangement 3 and the balancing layer 4, may be at least 20%, such as at least 35% or at least 50%, of a thickness T1 of the panel.

Moreover, the thickness T4 of the balancing layer may be larger than a thickness TU of an upper layer. For example, said upper layer may be an uppermost layer 2a, such as the wear layer. This is illustrated in, e.g., FIG. 1e.

Figure 5D:
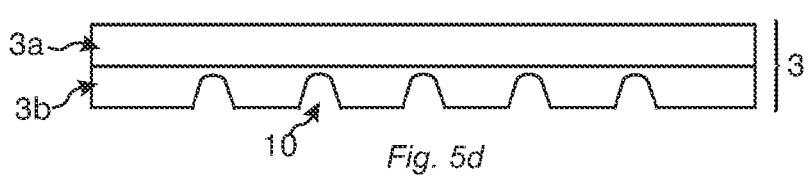

FIG. 5d shows in a cross-sectional side view an embodiment of a lower layer arrangement 3 comprising a first 3a and a second 3b lower layer. Any of the lower layer arrangements in FIGS. 1c-1e, 2a-2d, 5a, 5c, 6a-6c, 7a-7c may be replaced with such a lower layer arrangement, preferably with grooves therein.

FIGS. 3a-3c, 4a-4c, 5b, 7d-7f, 8c and 9b illustrate embodiments of a thermoplastic-based panel 1 in the form of a floor panel according to the second aspect. The panel comprises an upper layer arrangement 2 and a balancing layer 4, which is a bottom layer 5' of the panel. The upper layer arrangement comprises at least one upper layer 2a, 2b, 2c, 2d. A groove arrangement 10 comprising a plurality of grooves 11 is provided in the balancing layer.

Figure 3A:
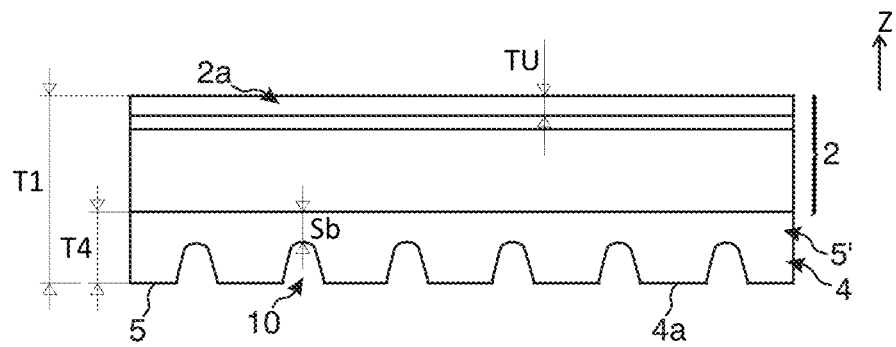
FIGS. 3a-3c illustrate exemplary embodiments of a building panel according to the second aspect in cross-sectional side views (FIGS. 3a-3b) and a bottom view (FIG. 3c).
Figure 3B:
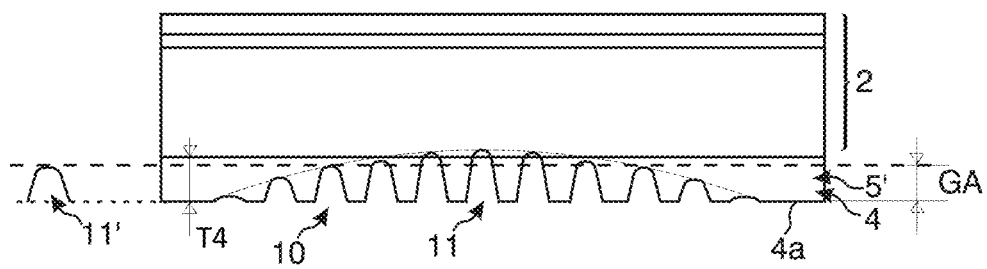
Figure 3C:
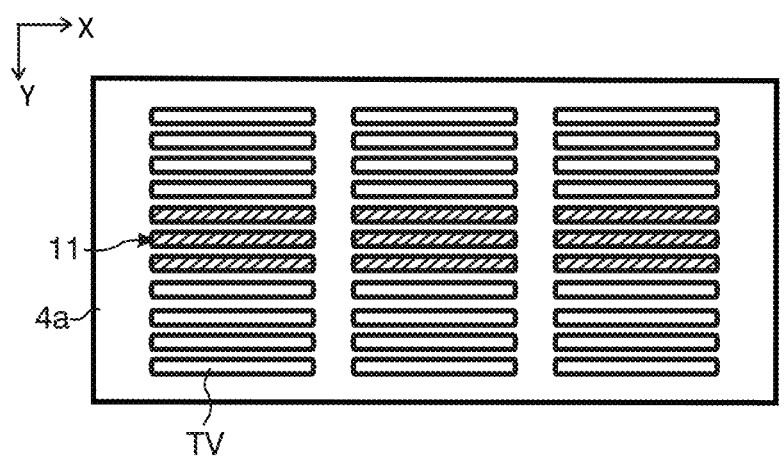

A major portion of the grooves are provided in the balancing layer 4 only. At least 50% of a total volume TV of the grooves may be provided in the balancing layer only. Such a scenario is shown in the non-limiting embodiment in FIG. 3c, which is a bottom view of the panel shown in a cross-sectional side view in FIG. 3b. Alternatively, or additionally, a major portion of a total number of the grooves may be provided in the balancing layer only. In FIG. 3c, for example, there are 24 grooves provided in the balancing layer only while 9 grooves are provided also in the upper layer arrangement 2, c.f. FIG. 3b.

Embodiments of the upper layer arrangement 2 of the second aspect may be the same as for the first aspect, whereby reference is made to those parts of the disclosure.

In some embodiments, the upper layer arrangement 2 may be laminated to the balancing layer 4. In turn, at least some upper layers may be laminated to each other. For example, the upper layer(s) and the balancing layer may be provided as sheets or may be provided on rolls and may be laminated to each other under heat and pressure. The sheets may be stacked on top of each other and, for example, may be laminated to each other in a hot press or a multi-daylight static press. The layers provided on rolls may be laminated to each other in a continuous process. In some embodiments, the balancing layer may be coextruded with at least one upper layer, such as with all upper layers except for the wear layer and/or the print layer.

As shown in the embodiments in FIGS. 3a-3c, 4a-4c and 7d, the grooves 11 may be provided in a rear side 4a of the balancing layer and hence preferably in a rear side 5 of the panel.

For example, the grooves may be post-formed or pre-formed as described in relation to the first aspect. As shown in FIG. 5b, it is conceivable that internal grooves may be provided within the balancing layer 4. The internal grooves may be pre-formed, such as being formed during manufacturing of the balancing layer and/or the panel, e.g., by (co-)extrusion. As described above, the internal grooves 10 may have walls along one horizontal direction and the vertical direction of the panel and may be open towards the other horizontal direction.

All of the grooves 11 may be provided in the balancing layer 4 only as shown, e.g., in the embodiments in FIGS. 3a, 4b-4c, 5b and 7d.

Figure 1C:
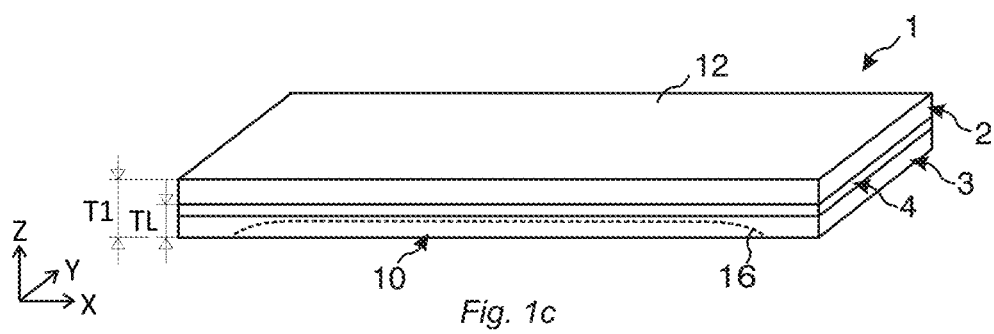
FIGS. 1c-1e illustrate exemplary embodiments of a building panel according to the first aspect in a perspective view (FIG. 1c), a bottom view (FIG. 1d) and a cross-sectional side view (FIG. 1e).
Figure 1D:
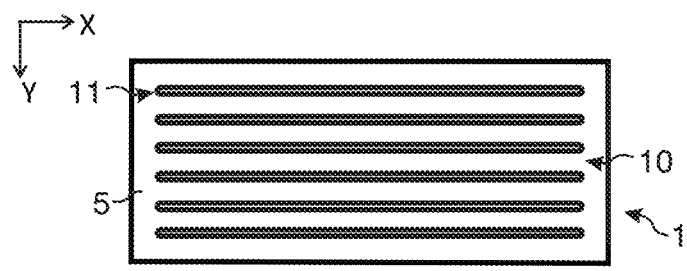
Figure 1E:
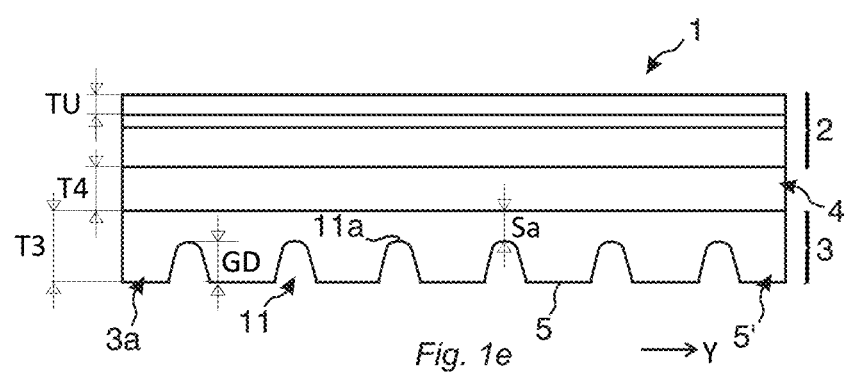

Generally herein for the first, second and third aspects, the grooves 11 may be provided inside all of the edge portions 1a-1d of the panel along a first X and a second Y horizontal direction, see, e.g., FIGS. 1c-1d and 3c. Moreover, one edge portion 16, or preferably both of the edge portions, of the grooves may be curved along a longitudinal extension of the grooves. The grooves may be open towards the rear side.

The balancing layer 4 may have a varying thickness T4 along a first X and/or a second Y horizontal direction of the panel, for example by having grooves 11 provided at least partly in the balancing layer. The embodiments in, e.g., FIGS. 3a-3c, 4a-4b and 7d illustrate a varying thickness along the second horizontal direction Y. Optionally, the thickness may vary also along the first horizontal direction X, e.g., by having grooves provided inside the edge portions of the panel along the first horizontal direction X, see, e.g., FIG. 3c.

Figure 4A:
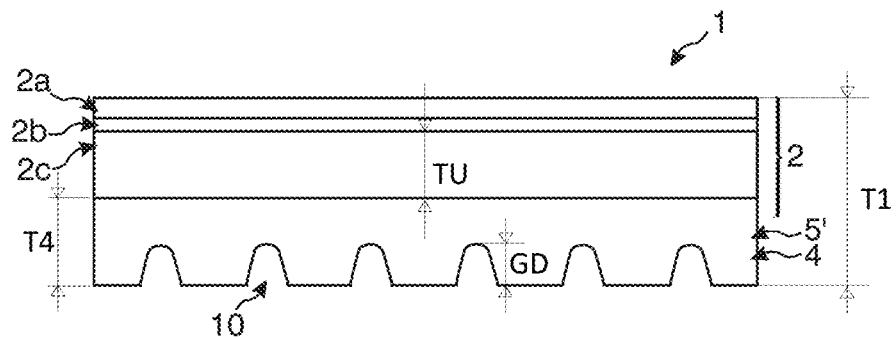
FIGS. 4a-4c illustrate exemplary embodiments of a building panel according to the second aspect in cross-sectional side views.
Figure 4B:
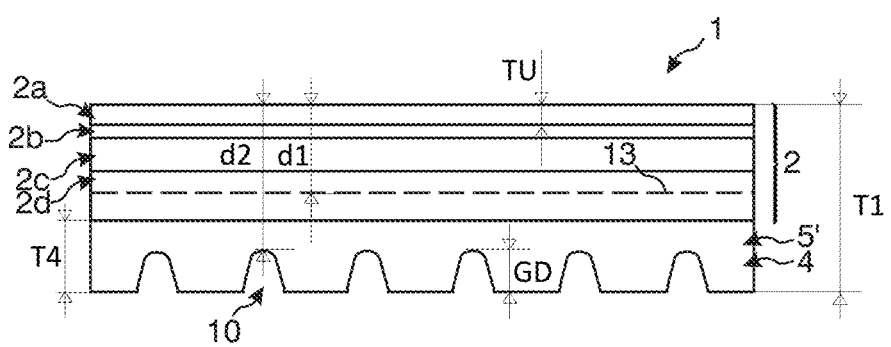
Figure 4C:
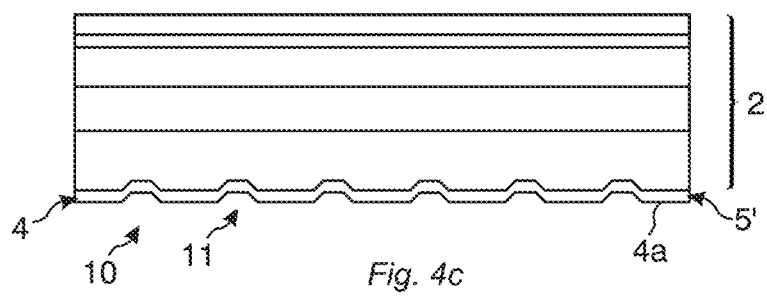

As shown in, e.g., FIGS. 4c and 5b, the balancing layer 4 may have a substantially constant thickness. For example, the balancing layer may be (co-)extruded with at least one upper layer in the upper layer arrangement 2.

In some embodiments, and as shown in FIGS. 4a-4b, a thickness T4 of the balancing layer is larger than a thickness TU of an upper layer of the upper layer arrangement 2. Preferably, this upper layer is an uppermost layer 2a of the upper layer arrangement, for example a wear layer, but other upper layers are also conceivable. As shown in FIG. 4b, the thickness T4 of the balancing layer may be larger than a thickness TU of each upper layer in the upper layer arrangement.

Generally for the second aspect, the thickness T4 of the balancing layer 4 may be at least 20%, such as at least 35% or at least 50%, of a thickness T1 of the panel.

A groove depth GD of the grooves 11 may be larger than 20%, such as larger than 30% or even larger than 40%, of a thickness T4 of the balancing layer 4. In some embodiments, the groove depth GD may be larger than 20%, such as larger than 30% or larger than 40%, of a thickness T1 of the panel.

The embodiments in, e.g., FIGS. 3a-3b, 4a-4c, 5b and 7d show that an innermost portion 11a of any, some or even all of the grooves may be separated from the upper layer arrangement 2 by a distance Sb in the vertical direction Z of the panel. The distance Sb may be larger than 0.25 times a thickness TU of an uppermost layer 2a, such as a wear layer. Preferably, however, the distance is larger than 0.50 times or even larger than 1.0 times the thickness TU of the uppermost layer 2a.

In some embodiments of the first and second aspects, the groove depth GD of the grooves 11 are essentially the same, see, e.g., FIGS. 1e, 2b-2d, 3a, 4a-4c, 5a-c, 6b-6c and 7d. As shown in, e.g., FIGS. 2a and 3b, it is also conceivable that the groove depth GD of at least two grooves are different. The embodiments in FIGS. 2a, 3b and 7a, illustrate that the groove depth GD of one or several grooves 11, preferably edge grooves provided at an edge portion, such as a long edge portion 1a, 1b, may be smaller than the groove depth GD of other grooves, for example a groove provided horizontally inwardly of the edge groove(s), such as along the second horizontal direction Y.

As illustrated in, e.g., FIG. 3b, but which may be applied for any embodiment of the second aspect, such as in FIGS. 3a, 3c, 4a-4c, 5b and 7d-7f, an average groove depth GA of the grooves 11 may be smaller than the thickness T4. An average-depth groove 11' is schematically illustrated in FIG. 3b.

Optionally, and as illustrated in FIGS. 2b and 4b, the panel may comprise at least one reinforcement element 13, such as a glass-fibre layer. The at least one reinforcement element 13 may be provided in a centre portion of the panel, preferably being provided at a distance d1 from the front side 12 of between 35% and 65% of a distance d2 between the innermost portion 11a and a front side 12 of the panel.

The upper layer arrangement 2 in any of the embodiments of the first and second aspects, for example any of those in FIGS. 1c-1e, 2a-2d, 3a-3c, 4a-4c, 5a-5c, 6a-6c, 7a-7f, 8a-8d and 9a-9b may comprise a thermoplastic polymer, such as PVC, and, optionally, a filler, such as $CaCO_3$. In fact, in some embodiments each of the upper layers 2a, 2b, 2c, 2d may comprise a thermoplastic polymer, such as PVC, and, optionally, a filler. The upper layer arrangement may comprise a wear layer and/or a print layer, such as a print film. Both of these layers may comprise a thermoplastic polymer, such as PVC. In the same manner, the lower layer arrangement 3, such as each of the at least one lower layer 3a, 3b, in any of the embodiments in FIGS. 1c-1e, 2a-2d, 5a, 5d, 6a-6c, 7a-7c, 8a-8b, 8d and 9a may comprise a thermoplastic polymer, such as PVC, and, optionally, a filler, such as $CaCO_3$. Optionally, an amount of a thermoplastic polymer in the balancing layer 4 may be higher than an amount of a thermoplastic polymer in the upper 2 and/or lower 3 layer arrangement.

Furthermore, the balancing layer 4 in any of the embodiments of the first and second aspects, for example any of those in FIGS. 1c-1e, 2a-2d, 3a-3c, 4a-4c, 5a-5c, 6a-6c, 7a-7f, 8a-8d and 9a-9b, may comprise a thermoplastic polymer, such as PVC, and, optionally, a filler, such as $CaCO_3$.

The panel 1 in any of the embodiments in FIGS. 1c-1e, 2a-2d, 3a-3c, 4a-4c, 5a-5c, 6a-6c, 7a-7f, 8a-8d and 9a-9b may be a panel per se, e.g., configured to be laid loosely or glued to a substructure, or it may be a middle section of a panel comprising a mechanical locking system 20 provided in an edge portion 1a, 1b, 1c, 1d. In the latter case, the mechanical locking system may not be seen in said figures but may be implicitly understood. FIGS. 6a-6c, 7a-7c, 8a-8b, 8d and 9a, on the other hand, illustrate embodiments of floor panels 1, 1' according to the first aspect and FIGS. 7d-7f, 8c and 9b illustrate embodiments of floor panels 1, 1' according to the second aspect. The panels 1, 1' in these figures will be described with generic upper 2 and/or lower 3 layer arrangements. An ordinarily skilled artisan will appreciate, however, that, within the scope of the present disclosure, they may be embodied as in any of the embodiments herein, for example as in any of FIGS. 1c-1e, 2a-2d, 3a-3c, 4a-4c and 5a-5d. In particular, it is emphasized that the material composition of any of these panels may embodied in the same manner.

Figure 6A:
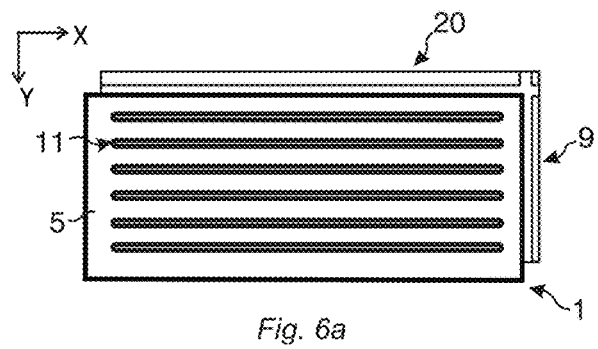
FIGS. 6a-6c illustrate exemplary embodiments of a building panel comprising a mechanical locking system in a bottom view (FIG. 6a), a cross-sectional top view (FIG. 6c) and in cross-sectional side views (FIGS. 6b-6c).
Figure 6B:
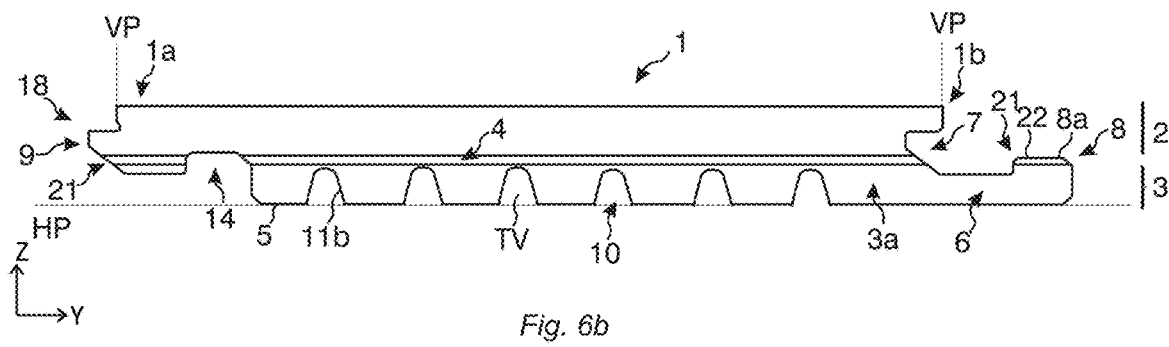
Figure 6C:
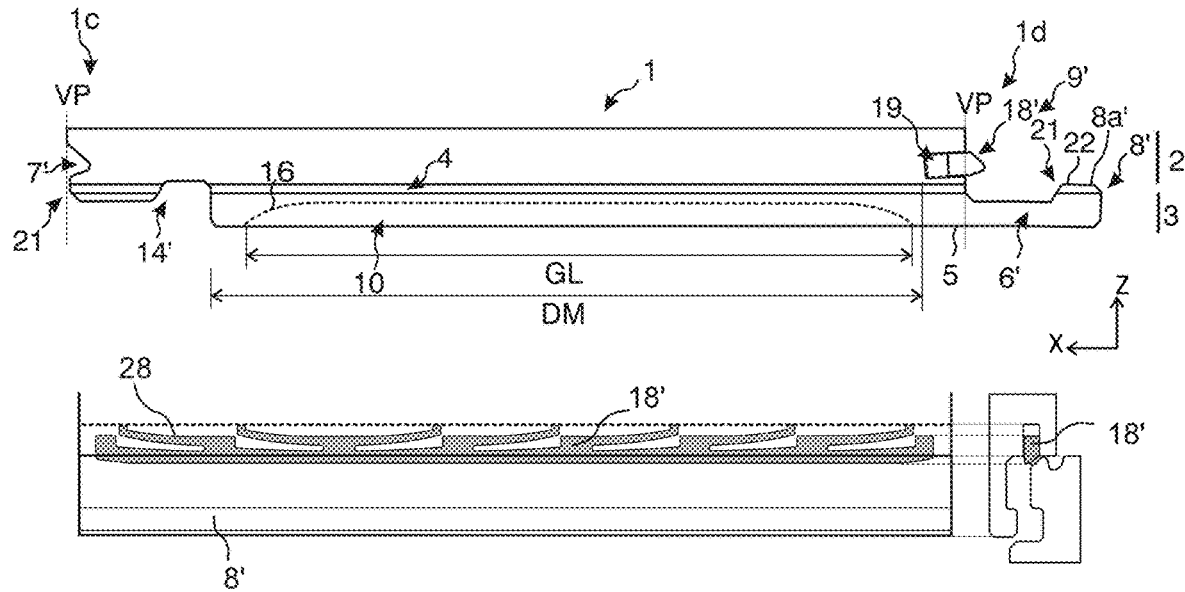
Figure 7A:
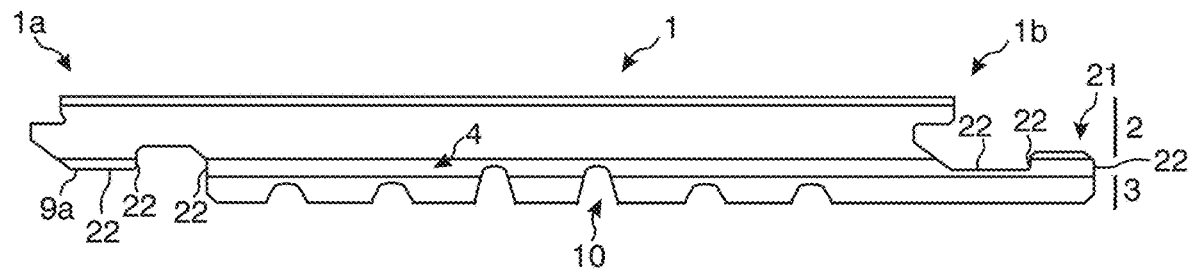
FIGS. 7a-7f illustrate exemplary embodiments of a building panel comprising a mechanical locking system and locking of building panels in cross-sectional side views and in zoomed-in cross-sectional side views.
Figure 7B:
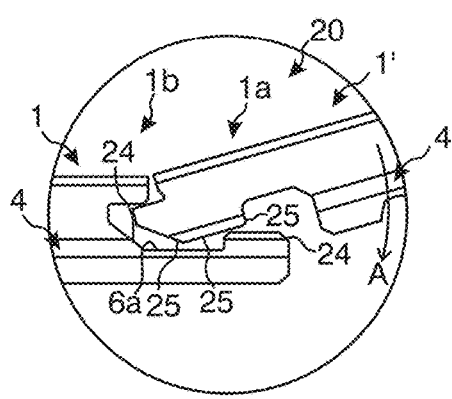

FIGS. 6a-6c illustrate an embodiment of a panel 1 in a bottom view as well as in cross-sectional side views of the panel along the long 1a, 1b and short 1c, 1d edge portions. Embodiments described herein for the panel 1 are equally possible for the adjacent panel 1'.

Any of the panels disclosed herein, such as those in any of FIGS. 1c-1e, 2a-2d, 3a-3c, 4a-4c, 5a-5d, 6a-6c, 7a-7f, 8a-8d and 9a-9b, may comprise a mechanical locking system 20 in accordance with the third aspect for horizontally and/or vertically locking the panel 1 to an adjacent panel 1'. Such a mechanical locking system comprises a cooperating surface 21 provided in an edge portion 1a, 1b, 1c, 1d of the panel 1 and is configured to cooperate with a cooperating surface 21 of the adjacent panel 1'. The cooperating surface 21 is at least partially situated in the balancing layer 4 of the panel 1.

The panel 1 may be configured to be locked to the adjacent similar panel 1' on the edge portions, such as the long 1a, 1b and short 1c, 1d edge portions, by angling A and/or by a vertical displacement V with respect to each other. FIGS. 6*b*, 7*a*-7*b* and 7*d*-7*e* and FIGS. 6*c*, 7*c*, 7*f*, 8*a*-8*d* and 9*a*-9*b* show embodiments of a panel 1 configured to be locked by angling A and by a vertical displacement V, respectively. The panels 1, 1' in FIGS. 8*a*-8*d* and 9*a*-9*b* are shown around their short edge portions 1*c*, 1*d* but alternatively, or additionally, it is equally conceivable to use any such mechanical locking system on the long edge portions 1*a*, 1*b* of panels.

Generally, the mechanical locking system 20 of each of the panels 1, 1' may comprise at least one cooperating surface 21, preferably at least one locking surface 22, 23 and/or at least one guiding surface 24, 25. The at least one cooperating surface 21 may be provided in an edge portion or in opposite edge portions, such as a short 1*c*, 1*d* and/or a long 1*a*, 1*b* edge portion. An ordinarily skilled artisan will appreciate that, within the scope of the present disclosure, the cooperating surface 21 may be a first cooperating surface provided in a first edge portion, such as a long 1*a*, 1*b* or a short 1*c*, 1*d* edge portion, and that the mechanical locking system may further comprise a second cooperating surface 21 provided in a second opposite edge portion, such as a short 1*c*, 1*d* or a long 1*a*, 1*b* edge portion. The second cooperating surface 21 may be at least partially situated in the balancing layer 4.

In some embodiments, the panels 1, 1' may be formed by providing the upper layer(s) 2*a*, 2*b*, 2*c*, 2*d* and the balancing layer 4 as sheets or on rolls which then are laminated to each other under heat and pressure. Where applicable, such as in the first aspect, also the lower layer(s) 3*a*, 3*b* may optionally be provided as sheets or on rolls and may be laminated to each other and the other layers of the panel under heat and pressure. Alternatively to the above, the balancing layer may be coextruded with at least one upper and/or lower layer. In any of these scenarios, before forming the mechanical locking system in the panels 1, 1', the balancing layer 4 may extend into the edge portion(s) 1*a*-1*d* of the panels, see e.g. FIGS. 1*c*-1*e*, 2*a*-2*d*, 3*a*-3*c*, 4*a*-4*c* and 5*a*-5*d*. The mechanical locking system may be formed by removing material from the edge portion(s) 1*a*-1*d*. A portion of the balancing layer may remain in the edge portion after the forming of the mechanical locking system, see the embodiments in FIGS. 6*a*-6*c*, 7*a*-7*f*, 8*a*-8*d* and 9*a*-9*b*. In particular, the balancing layer may remain at substantially the same vertical position.

The embodiments in, e.g., FIGS. 6*b*-6*c*, 7*a*, 7*d*, 8*a*-8*d* and 9*b* illustrate panels 1, 1' wherein the cooperating surface 21 is a locking surface 22, 23 configured to engage with a locking surface 23, 22 of the adjacent panel 1'/panel 1 in a locked state. As shown, the locking surfaces 22, 23 may be at least partially situated in the balancing layer 4 of the respective panel 1, 1'. Generally, the locking surfaces 22, 23 may be vertical and/or horizontal locking surfaces 22, 23. In FIG. 7*a*, the locking surface 22 includes an upward-facing horizontal recessed portion of the cooperating surface 21. In FIG. 7*a*, this lowermost upward-facing horizontal recessed portion is a surface of the balancing layer 4.

The embodiments in, e.g., FIGS. 7*b*-7*c*, 7*e*-7*f* and 9*a*-9*b* illustrate panels 1, 1' wherein the cooperating surface 21 is a guiding surface 24, 25 configured to guide the adjacent panel 1'/panel 1 during locking. The guiding may be implemented by a guiding surface 24, 25 cooperating or engaging with a cooperating surface 21, such as guiding surface 25, 24, of the adjacent panel during locking. As shown, the guiding surface(s) 24, 25 may be at least partially situated in the balancing layer 4 of the respective panel 1, 1'. Generally, the guiding surfaces 24, 25 may guide the adjacent panel vertically and/or horizontally.

As shown in e.g., FIGS. 6*b*-*c*, the mechanical locking system 20 of the panel 1, such as on the long 1*a*, 1*b* and/or short 1*c*, 1*d* edge portions, may comprise a locking element 8, 8' provided on a strip 6, 6' configured to engage with a locking groove 14, 14' of the adjacent panel 1' for horizontal locking. The strip 6, 6' may extend horizontally inwardly of, and may comprise a portion which is thinner than, the locking element 8, 8'. The balancing layer 4 may at least partially extend through the locking element 8, 8' and/or through the locking groove 14, 14'. Moreover, the cooperating surface 21 may be situated on the locking element 8, 8' and/or in the locking groove 14, 14'. In some embodiments, and as shown in, e.g., FIGS. 6*b*-6*c*, 7*c*-7*f*, 8*a*-8*d* and 9*a*-9*b*, an uppermost surface 8*a*, 8*a*' of the locking element may comprise a portion of the balancing layer and a cooperating surface 21, such as a locking surface 22 and/or a guiding surface 24, may be provided in the uppermost surface 8*a*, 8*a*'.

The balancing layer 4 may at least partially extend along the strip 6, 6', such as along an upper portion of the strip. For example, the balancing layer 4 may extend along a part of, or the entire, upward facing surface(s) of the strip 6, 6'. As shown in, e.g., FIGS. 7*a*-7*b*, 7*d*-7*f*, 8*a*, 8*c*-8*d* and 9*a*-9*b*, an uppermost surface 6*a*, 6*a*' of the strip may comprise a portion of the balancing layer. A cooperating surface 21, such as a locking surface 22 and/or a guiding surface 24, may be provided in the uppermost surface 6*a*, 6*a*'.

Figure 7C:
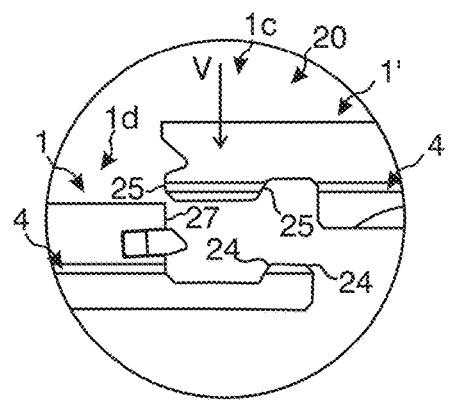
Figure 7D:
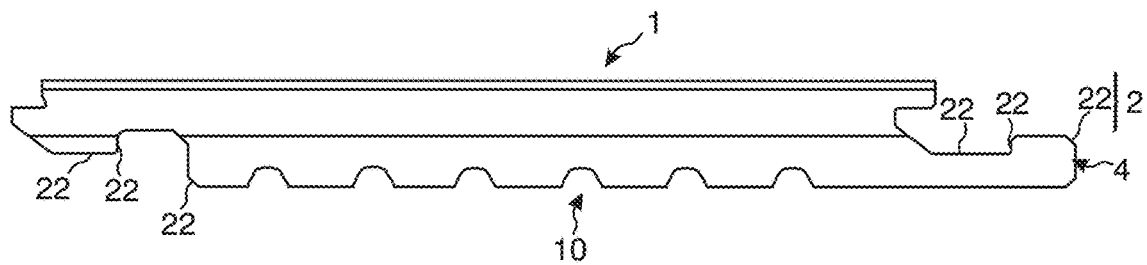
Figure 7E:
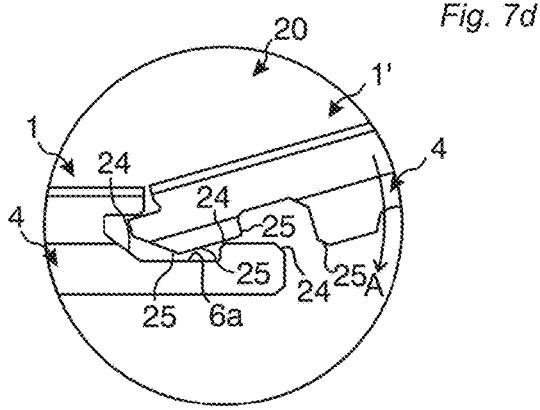
Figure 7F:
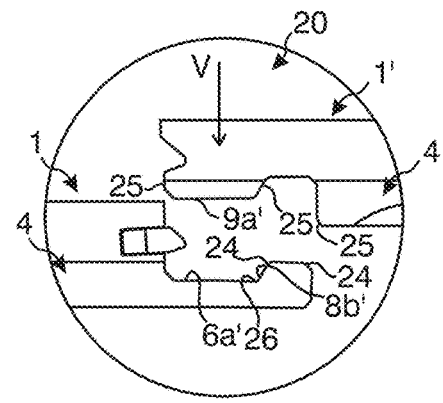
Figure 8A:
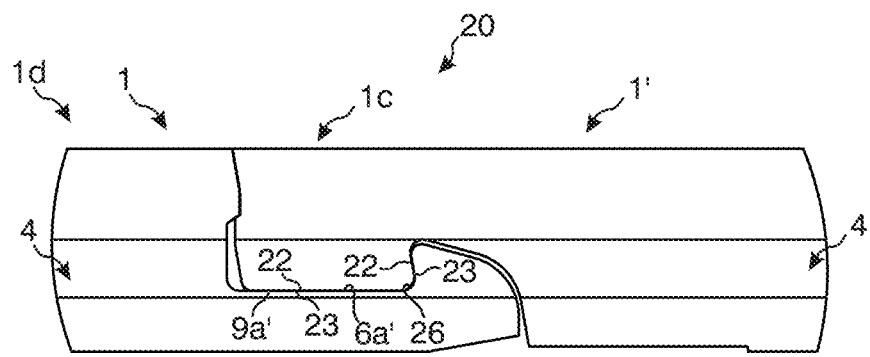
FIGS. 8a-8d illustrate exemplary embodiments of a building panel comprising a mechanical locking system in cross-sectional side views.

As shown in, e.g., FIGS. 7*f* and 8*a*, a transitional surface 26 transitioning from the uppermost surface 6*a*' of the strip 6' to the locking element 8', such as an inner wall 8*b*' of the locking element, may comprise a portion of the balancing layer 4. The uppermost surface 6*a*' may be provided horizontally inwardly of the locking element 8'. This embodiment may be particularly advantageous on a short edge portion 1*d* where particularly high stresses are conceivable.

Furthermore, the mechanical locking system 20 of the panel 1, such as on the long 1*a*, 1*b* and/or short 1*c*, 1*d* edge portions, may comprise a tongue portion 9, 9' configured to engage with a tongue groove 7, 7' of the adjacent panel 1' for vertical locking. The balancing layer 4 may at least partially extend through the tongue portion 9, such as through a lower portion of the tongue portion. As illustrated in, e.g., FIGS. 6*b*-6*c*, 7*a*-7*f*, 8*a*-8*d* and 9*a*-9*b*, a cooperating surface 21, such as a locking surface 22, 23 and/or a guiding surface 24, 25, may be situated on the tongue portion 9, 9'. A lowermost surface 9*a*, 9*a*' of the tongue portion may comprise a portion of the balancing layer and the cooperating surface 21 may be provided in the lowermost surface 9*a*, 9*a*', see, e.g., FIGS. 7*a*-7*b*, 7*d*-7*f*, 8*a*, 8*c*-8*d* and 9*a*-9*b*.

As shown in, e.g., FIG. 6*b*, the tongue portion 9, preferably provided in a long edge portion 1*a*, may comprise a tongue 18 that is integrally formed with the panel. Moreover, as shown in, e.g., FIG. 6*c*, the tongue portion 9', preferably provided in a short edge portion 1*d*, may comprise a separate, and preferably flexible, tongue 18' that is configured to be provided in a displacement groove 19 provided at an edge portion, such as the short edge portion 1*d*, of the panel. A non-limiting embodiment of a tongue 18' is illustrated in FIG. 6*c* in a cross-sectional top view. This so-called bristle tongue is preferably formed in one-piece and comprises flexible protrusions 28.

The cooperating surface 21, such as a locking surface and/or guiding surface, of the adjacent panel 1' may be a general cooperating surface provided at the edge portion. Optionally, however, it may be at least partially situated in the balancing layer 4 of the adjacent panel 1'. In a first example, and as shown in, e.g., FIGS. 8*a*-8*d*, but which is generally applicable, e.g., for the embodiments in FIGS. 6b-6c and 7a-7f, in a locked state, a portion of a vertical and/or a horizontal locking surface 22 of panel 1 comprising the balancing layer 4 may be configured to engage with a portion of a vertical and/or a horizontal locking surface 23 of panel 1' comprising the balancing layer 4. In a second general example, and as shown in, e.g., FIGS. 7b-7c, 7e-7f and 9a-9b, during locking, a portion of a vertical and/or a horizontal guiding surface 24 of panel 1 comprising the balancing layer 4 may be configured to cooperate with a portion of a vertical and/or a horizontal guiding surface 25 of panel 1' comprising the balancing layer 4. A third general example includes all portion configurations of the first and second examples.

It is emphasized that the roles of the panel 1 and the adjacent panel 1' described herein may be interchanged.

Figure 9A:
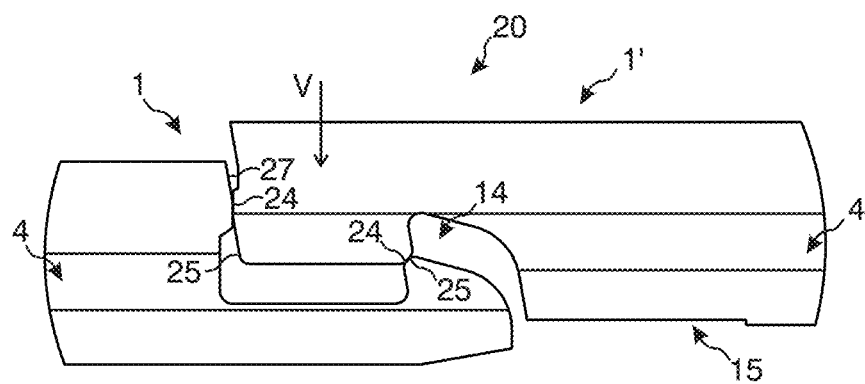
FIGS. 9a-9b illustrate in cross-sectional side views exemplary embodiments of building panels comprising a mechanical locking system and their locking.
Figure 9B:
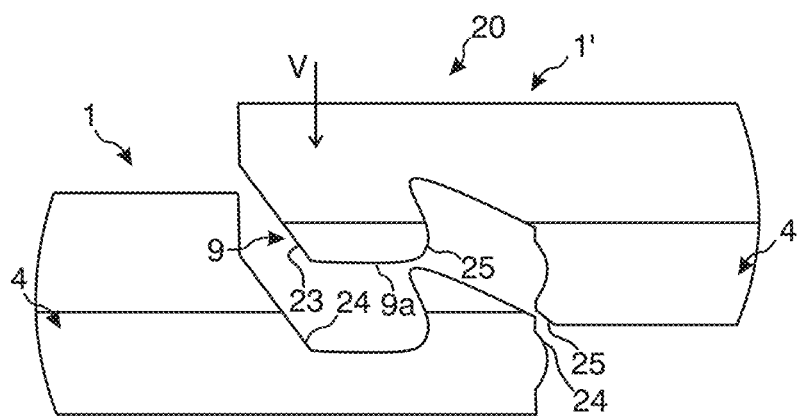

In a first example, and as illustrated in, e.g., FIGS. 7b-7c, 7e-7f and 9a-9b, the guiding surface 25 of the panel 1' may be provided in an edge portion 1a, 1c, may be at least partially situated in the balancing layer 4 of the panel 1', and may be configured to cooperate with a cooperating surface 21 of the panel 1 during locking. Embodiments and examples of the guiding surface 25 of the panel 1' have been described above in relation to these figures. As shown in FIGS. 7b, 7e and 9a-9b, such a cooperating surface 21 may be provided on the uppermost surface 6a of the strip 6 and/or on the locking element 8. As shown in FIGS. 9a-9b, such a cooperating surface 21 may also be provided in a wall 27 in the upper edge of the panel 1, optionally being provided along a vertical plane VP defined by juxtaposed upper edges of the panels 1, 1'. Moreover, as shown in FIGS. 7c and 7f, such a cooperating surface 21 may be provided in a wall 27 in the upper edge of the panel 1 provided along said vertical plane VP and/or on the separate, and preferably flexible, tongue 18'.

In a second example, and as illustrated in, e.g., FIGS. 8a-8d, the locking surface 23 of the panel 1' may be provided in an edge portion 1c, may be at least partially situated in the balancing layer 4 of the panel 1', and may be configured to engage with a locking surface 22 of the panel 1 in a locked state of the panels 1, 1'. As shown in FIGS. 8a-8d, such a locking surface 22 may be provided on the uppermost surface 6a of the strip 6 and/or on the locking element 8, such as in an uppermost surface 8a, an inner wall 8b and/or an outer wall 8c thereof.

An ordinarily skilled artisan will appreciate that, within the scope of the present disclosure, in some embodiments, the mechanical locking system 20 comprises a cooperating surface 21 at least partially situated in the balancing layer 4 and, in addition, comprises a cooperating surface 21 only provided in the upper 2 and/or lower 3 layer arrangement.

It is yet again stressed that the groove arrangement 10 is optional with respect to the third aspect. Indeed, the embodiments in, e.g., FIGS. 8a-8d and 9a-9b are illustrated without any grooves 11 therein, even though grooves, such as those shown in any of the embodiments in FIGS. 6a-6c, 7a and 7d, clearly are not excluded. It is also noted that in any embodiment herein, the grooves may be provided between the mechanical locking system 20 provided at a pair of opposite edge portions, such as short edge portions 1c, 1d. As shown in, e.g., FIG. 6c, a groove length GL may be smaller than a distance DM between the mechanical locking system 20 at the pair of opposite edge portions, such as between inner portions thereof.

Figure 8B:
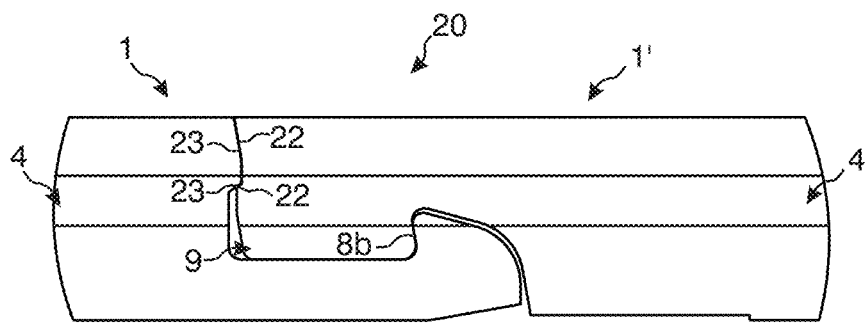
Figure 8C:
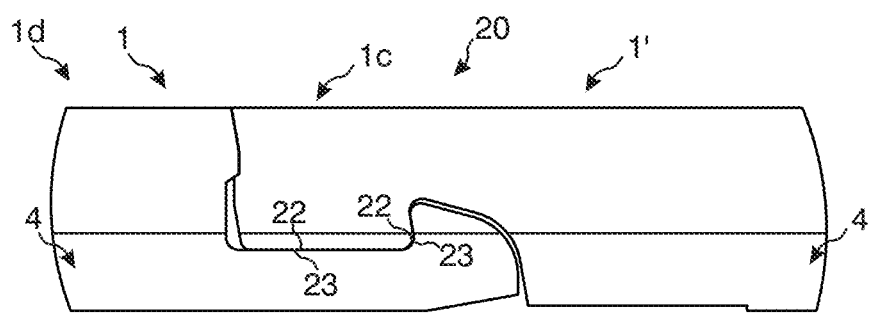
Figure 8D:
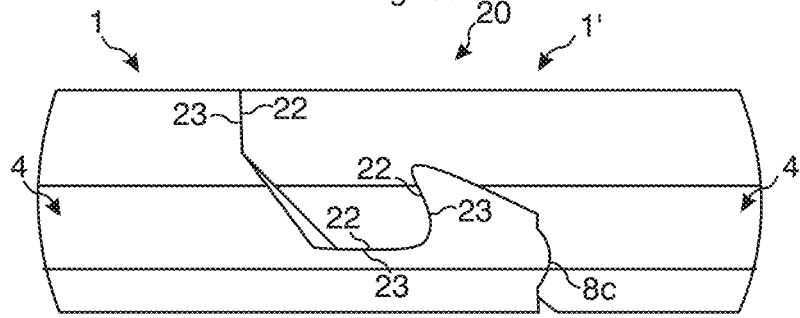

In some embodiments, and as illustrated in FIG. 9a as well as in FIGS. 8a-8c, the groove arrangement 10 may comprise a calibrating groove 15 for facilitating locking of the panels, such as when the panels have diverging thicknesses or when no underlay element, such as a foam, is used. The calibrating groove 15 may be provided at the edge portion of the adjacent panel 1', preferably in a rear side 5 thereof. Moreover, the calibrating groove 15 may be provided adjacent, such as directly adjacent, to the locking groove 14.

TABLE 1

Embodiments of layer combinations in the first aspect

|  | A1 | A2 | A3 | A4 | A5 |
|---|---|---|---|---|---|
| Upper layer | L1 | U1 | L1 | U1 | L1 |
| Balancing layer | L3 | L3 | L3 | U2 | U2 |
| Lower layer | L1 | U1 | E1 | U1 | E1 |

TABLE 2

Embodiments of layer combinations in the first aspect

|  | B1 | B2 | B3 | B4 | B5 |
|---|---|---|---|---|---|
| First upper layer | L2 | U2 | L2 | L2 | U2 |
| Second upper layer | L1 | U1 | U1 | L1 | U1 |
| Balancing layer | L3 | U2 | L3 | L3 | U2 |
| Lower layer | L1 | U1 | U1 | E1 | E1 |

TABLE 3

Embodiments of layer combinations in the second aspect

|  | C1 | C2 | C3 | C4 |
|---|---|---|---|---|
| Upper layer | L1 | U1 | L1 | U1 |
| Balancing layer | L3 | L3 | U2 | U2 |

TABLE 4

Embodiments of layer combinations in the second aspect

|  | D1 | D2 | D3 | D4 | D5 | D6 |
|---|---|---|---|---|---|---|
| First upper layer | L2 | L1 | L1 | L1 | U1 | U2 |
| Second upper layer | L1 | E1 | U1 | E1 | E1 | U1 |
| Balancing layer | L3 | L3 | L3 | U2 | U2 | U2 |

TABLE 5

Examples of material compositions in the first and second aspects

|  | PVC (wt %) | CaCO$_3$ (wt %) | Plasticizer (wt %) | Additives (wt %) | Foaming agent (wt %) |
|---|---|---|---|---|---|
| L1 | 10-35 | 60-90 | 2-20 | 0.5-10.0 | 0-3 |
| L2 | 20-50 | 40-80 | 2-20 | 0.5-10.0 | 0-3 |
| L3 | 30-70 | 20-70 | 2-20 | 0.5-10.0 | 0-3 |
| U1 | 10-40 | 60-85 | 0-5 | 0.5-10.0 | 0-3 |
| U2 | 20-50 | 40-70 | 0-5 | 0.5-10.0 | 0-3 |
| E1 | 30-60 | 40-60 | 0-5 | 0.5-10.0 | 0.1-5.0 |

Tables 1 and 2 illustrate non-limiting embodiments, respectively, of layer combinations A1, . . . , A5 and B1, . . . , B5 of the first aspect that are conceivable for any of the panels in, e.g., FIGS. 1c-1e, 2a-2d, 5a, 5c, 6a-6c, 7a-7c, 8a-8b, 8d and 9a. Moreover, Tables 3 and 4 illustrate non-limiting embodiments, respectively, of layer combinations C1, . . . , C4 and D1, . . . , D6 of the second aspect that are conceivable for any of the panels in, e.g., FIGS. 3a-3c, 4a-4c, 5b, 7d-7f, 8c and 9b. An ordinarily skilled artisan will appreciate that, within the scope of the present disclosure, a panel comprising any of the layer combinations in Tables 1-4 additionally may comprise a wear layer and/or a print layer. Additionally, a coating, such as an UV coating, may be provided on the upper layer arrangement. For the layer combinations B1, . . . , B5 and D1, . . . , D6, the first upper layer may be provided above the second upper layer. Generally, each of the upper layer(s), the lower layer and balancing layer may comprise a thermoplastic polymer, such as PVC. Preferably, each of said layers comprises a filler, such as $CaCO_3$. Moreover, each layer may comprise a plasticizer and/or additives, such as a stabilizer, an impact modifier, a pigment, or a lubricant, and, optionally, a foaming agent.

Non-limiting examples of material compositions L1-L3, U1, U2 and E1 of upper layers, lower layers and the balancing layer—specified in weight percentages (wt %)—are shown in Table 5. These material compositions may be applied to any of the layer combinations in Tables 1-4.

In some embodiments, the upper layer(s) and the balancing layer may comprise different material compositions, cf. A1-A5, B1, B3-B4, C1-C4 and D1-D5. Moreover, in some embodiments, an upper layer and the balancing layer may comprise a substantially similar material composition, cf. B2, B5 and D6. In some embodiments of the first aspect, the upper layer(s) and the lower layer, may comprise different material compositions, cf. A3, A5 and B4-B5. In some embodiments, however, an upper layer and a lower layer may comprise a substantially similar material composition, cf. A1, A2, A4 and B1-B3. In any of these embodiments, the thicknesses of the layers having a substantially similar material composition may be different.

Figure 2D:
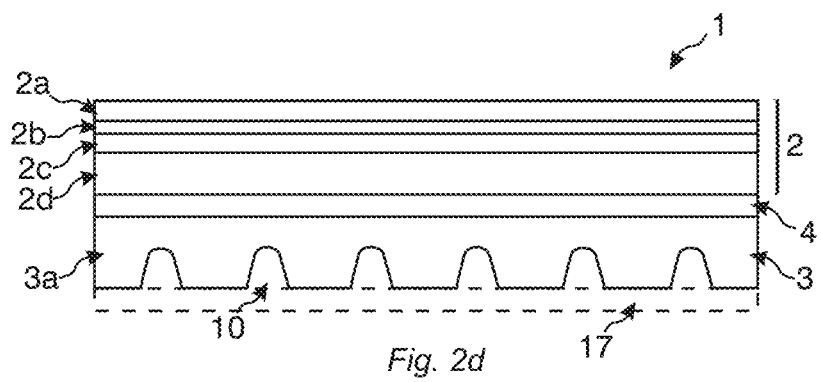

Aspects of the disclosure have mainly been described above with reference to a few embodiments. However, as would be readily appreciated by a person skilled in the art, other embodiments than the ones disclosed above are equally possible within the scope of the disclosure, as defined by the appended patent claims and items in an embodiment section below. For instance, in any embodiment herein, and as schematically illustrated in FIG. 2d, a separately formed underlay element 17, such as a foam or cork, may at least partially cover the rear side 5 of the panel, which may be provided in the lower layer arrangement 3 (first aspect) or in the balancing layer 4 (second aspect).

EXAMPLES

The following examples further describe and demonstrate embodiments within the scope of the present disclosure. The examples are given solely for the purpose of illustration and are not to be construed as limitations of the present disclosure, as many variations thereof are possible without departing from the spirit and scope of the disclosure.

Figure 10A:
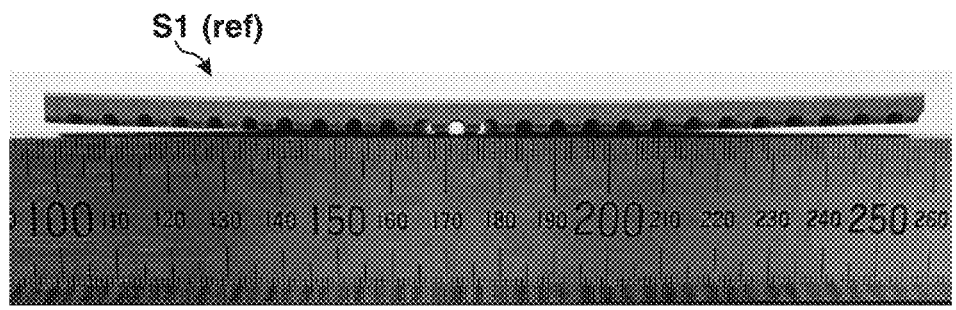
FIGS. 10a-10c show a photo of a sample exemplary reference panel and photos of sample exemplary panels according to the first aspect showing the curling effect under certain temperature variations.
Figure 10B:
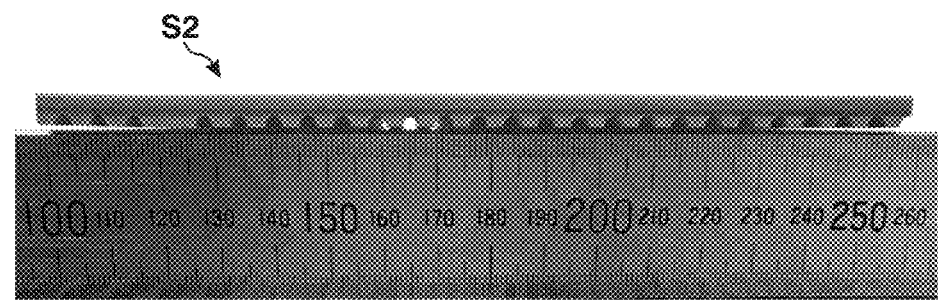
Figure 10C:
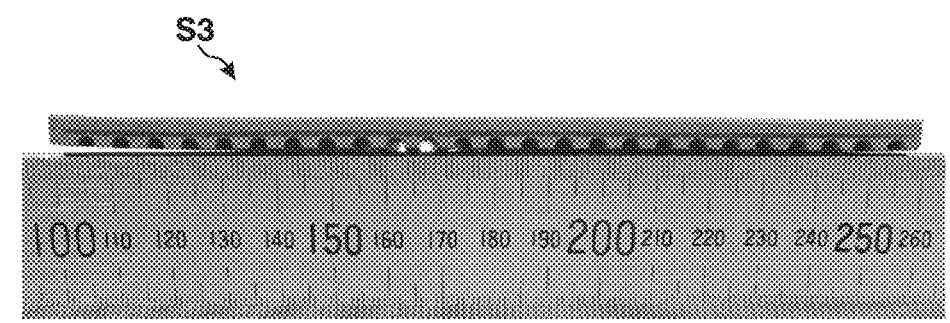

To test the curling effect of the panels in accordance with the first aspect, the following measurements were conducted utilizing an Indicator Method on each of a set of samples S1, S2 and S3, each sample having horizontal dimensions 160× 160 mm. These samples are represented in FIGS. 10a-10c as photos together with a ruler indicating a millimetre scale. FIG. 10a shows a photo of a sample S1 (reference) produced with grooves fully penetrating a balancing layer provided as a bottom layer, while FIGS. 10b-10c show photos of samples S2, S3 produced in accordance with the first aspect, in the case when the grooves were provided in the lower layer only.

The compositions COM1, COM2 and WL0 were used in the samples. Specified in weight percentages, COM1 comprised 16.92% PVC (Norvinyl™ S5745), 76.14% $CaCO_3$ (Greenafiller™ 0-100), 0.34% stabilizer (Baerostab™ CT 1228 R), 0.08% lubricant (Baerolub™ PA Special), 6.43% plasticizer (Eastman™ 168) and 0.08% black pigments. Moreover, COM2 comprised 37.04% PVC (Norvinyl™ S5745), 50.00% $CaCO_3$ (Greenafiller™ 0-100), 0.74% stabilizer (Baerostab™ CT 1228 R), 0.19% lubricant (Baerolub™ PA Special), 11.85% plasticizer (Eastman™ 168) and 0.19% red pigments. WL0 comprised additives and a plasticizer and 75 wt % of PVC. The thicknesses of the layers of the samples, the total thickness of the samples and the groove depths GD are specified in millimetres in Table 6 and the material compositions of the layered structures are specified in Table 7. Each of the samples S1, S2 and S3 comprised a wear layer comprising additives and a plasticizer and 75 wt % of PVC and, additionally, a print layer comprising a PVC and white pigments and having a thickness of 0.04 mm.

TABLE 6

Sample data

| Sample | Wear Layer (mm) | Upper Layer (mm) | Balancing Layer (mm) | Lower Layer (mm) | Total Thickness (mm) | Groove Depths (mm) |
|---|---|---|---|---|---|---|
| S1 | 0.54 | 3.60 | 0.93 | — | 5.1 | 1.90-2.01 |
| S2 | 0.56 | 1.92 | 0.92 | 1.99 | 5.4 | 1.95-2.02 |
| S3 | 0.54 | 1.93 | 0.99 | 1.89 | 5.4 | 1.91-1.98 |
| S4 | 0.56 | 3.73 | 1.31 | — | 5.66 | 2.03 |
| S5 | 0.57 | 1.85 | 1.20 | 2.01 | 5.69 | 1.99 |
| S6 | 0.52 | 4.00 | 0.98 | — | 5.56 | 1.71-1.78 |
| S7 | 0.52 | 3.01 | 2.00 | — | 5.66 | 1.74-1.75 |
| S8 | 0.55 | 1.94 | 3.38 | — | 5.93 | 1.76-1.82 |

Figure 9C:
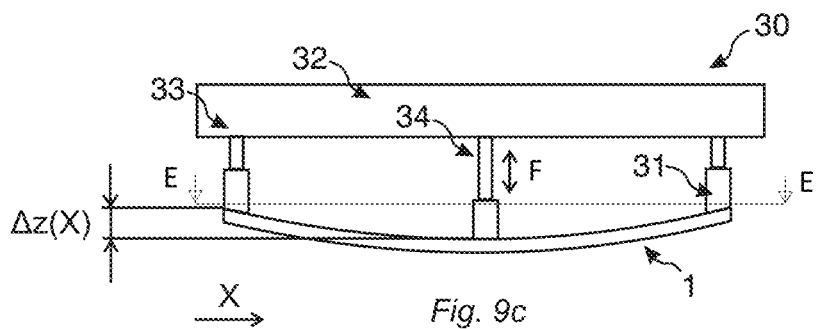
FIGS. 9c-9e illustrate an exemplary indicator device which may implement the Indicator Method described herein.

Measurements were conducted for each of the samples S1, S2 and S3 by using an indicator device 30 schematically illustrated in a side view in FIG. 9c. The indicator device comprised a pair of abutment portions 31 fixedly arranged on opposite sides 33 of a bar 32 at the same level. A displaceable indicator 34 arranged between the abutment portions 31 was configured to measure a deviation Δz of the displaceable indicator 34 with respect to the abutment portions 31 along a direction F being parallel with the displacement direction of the displaceable indicator 34.

Figure 9D:
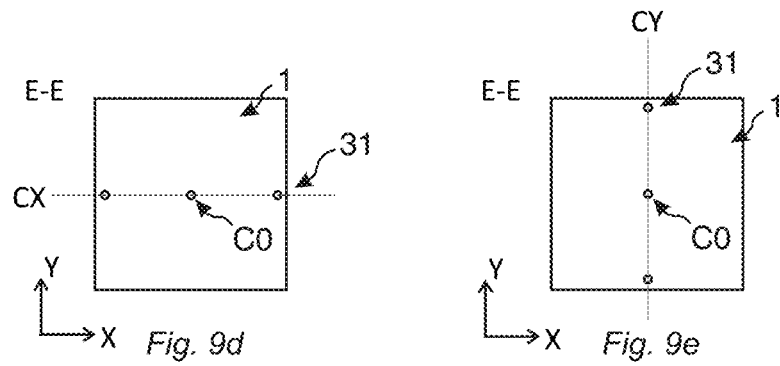
Figure 9E:
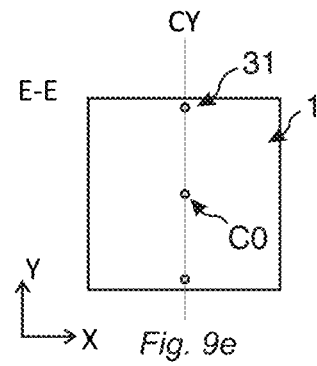

FIG. 9d shows a cross-sectional top view along the section E-E in FIG. 9c. FIG. 9e shows the same cross-sectional top view as in FIG. 9c, but with the indicator device 30 being rotated by 90 degrees in the X-Y plane. For each sample, a measurement was made along centre lines CX and CY of the sample which were parallel with the first X and second Y horizontal direction, respectively.

TABLE 7

Material compositions and test results of the samples

| Sample | Upper Layer | Balancing Layer | Lower Layer | $\Delta z_{12}(X)$ (mm) | $\Delta z_{12}(Y)$ (mm) |
|---|---|---|---|---|---|
| S1 | COM1 | COM2 | — | −0.40 | −0.42 |
| S2 | COM1 | COM2 | COM1 | −0.24 | −0.09 |
| S3 | COM1 | WL0 | COM1 | −0.14 | −0.02 |

More specifically, the abutment portions 31 abutted the sample along the centre line CX at a distance of 5 mm from the edges of the sample and the displaceable indicator 34 engaged with a centre point C0 of the sample, see FIG. 9d.

Thereby, a vertical deviation $\Delta z_1(X)$ was deduced at a temperature of 22° C. Also a vertical deviation $\Delta z_1(Y)$ along the centre line CY was deduced at the same temperature using a similar procedure, see FIG. 9e.

The sample was then heated to a temperature of 80° C. and was maintained at that temperature for six hours. Thereafter, the sample was acclimatized to a temperature of 22° C. for 24 hours. After acclimatization of the sample the vertical deviations $\Delta z(X)$ and $\Delta z(Y)$ were remeasured using the same approach as described above for obtaining the values $\Delta z_2(X)$ and $\Delta z_2(Y)$. The measured differences $\Delta z_{12}(X)=\Delta z_1(X)-\Delta z_2(X)$ and $\Delta z_{12}(Y)=\Delta z_1(Y)-\Delta z_2(Y)$ are summarized in Table 7. It may be seen that, as compared to the sample S1, the curling effect significantly decreased along the first X and second Y horizontal directions for S2 and S3 as a result of displacing the balancing layer in accordance with the first aspect.

Figure 10D:
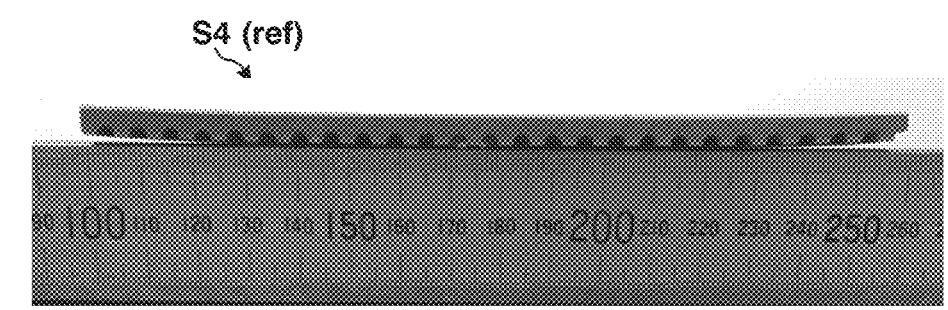
FIG. 10d shows a photo of a sample exemplary reference panel.
Figure 11A:
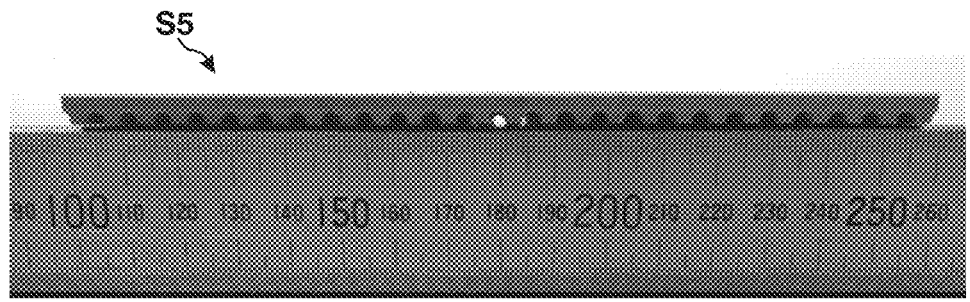
FIGS. 11a-11d show photos of sample exemplary panels according to the first and second aspects showing the curling effect and a photo of a sample exemplary reference panel.
Figure 11B:
Figure 11C:
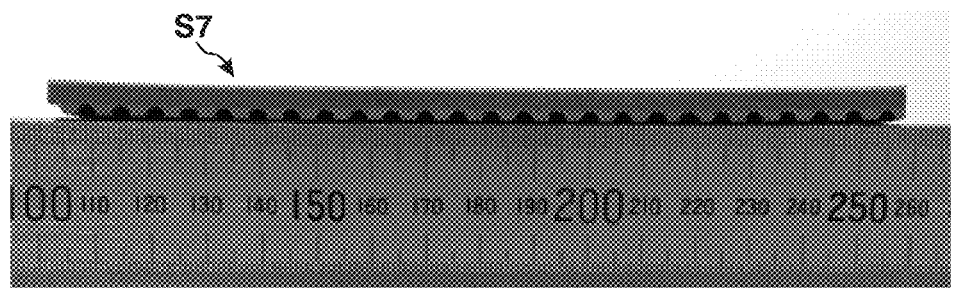
Figure 11D:
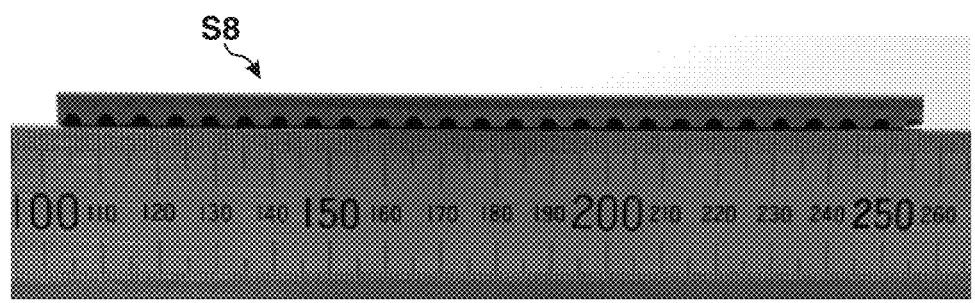
Figure 12A:
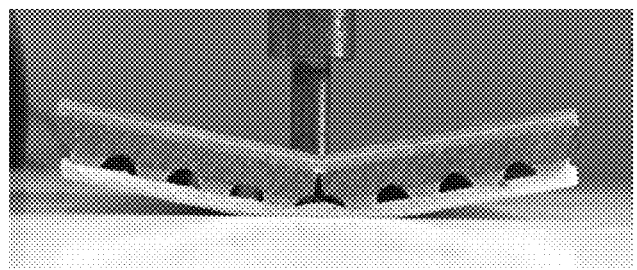
FIGS. 12a-12d show photos of sample exemplary panels according to the first aspect subjected to residual indentation tests.
Figure 12B:
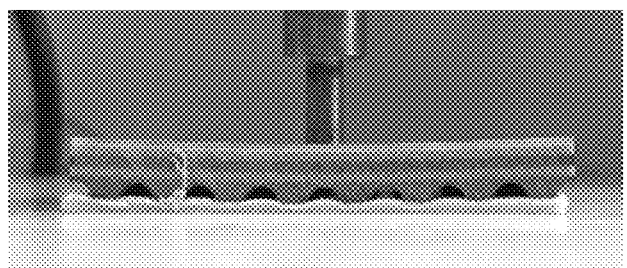
Figure 12C:
Figure 12D:

The curling effect was also tested on a sample S5 in accordance with the first aspect and samples S7 and S8 in accordance with the second aspect. FIG. 11a shows a photo of the sample S5 produced in accordance with the first aspect and FIGS. 11c-11d show photos of the samples S7 and S8 produced in accordance with the second aspect. The grooves in S5 (S7-S8) were provided in the lower layer only (in the balancing layer only). To see the improvement, the sample S5 (S7 or S8) was compared to reference sample S4 (S6) produced with grooves fully penetrating a balancing layer provided as a bottom layer. Photos of S4 and S6 are shown in FIG. 10d and FIG. 11b, respectively.

The curling effect was tested using the standard ISO 23999:2018, with the modification that each sample S4-S8 had a size of 160×160 mm (instead of 229×229 mm). The compositions COM1 (specified above), COM3 and COM4 were used in the samples. Specified in weight percentages, COM3 comprised 56.34% PVC (Norvinyl™ S5745), 28.17% CaCO$_3$(Greenafiller™ 0-100), 1.13% stabilizer (Baerostab™ CT 1228 R), 0.28% lubricant (Baerolub™ PA Special) and 14.08% plasticizer (Eastman™ 168) and COM4 comprised 37.11% PVC (Norvinyl™ S5745), 50.09% CaCO$_3$ (Greenafiller™ 0-100), 0.74% stabilizer (Baerostab™ CT 1228 R), 0.19% lubricant (Baerolub™ PA Special) and 11.87% plasticizer (Eastman™ 168).

The thicknesses and the groove depths GD of S4-S8 specified in mm are summarized in Table 6 and the material compositions are specified in Table 8. Each of the samples S4-S8 comprised a PVC wear layer and a print film comprising PVC having a thickness of about 0.60 mm and 0.06 mm, respectively. The measured differences $\Delta z_{12}(X)$ and $\Delta z_{12}(Y)$ using the Indicator Method as well as the mean value for curling using ISO 23999:2018 are summarized in Table 8 in mm. It may be seen that, as compared to the sample S4, the curling effect of S5 (first aspect) decreased using both tests. In particular, $\Delta z_{12}(Y)$ significantly decreased. Moreover, as compared to the sample S6, the curling effect of S7 and S8 (second aspect) decreased significantly using both tests.

TABLE 8

Material compositions and test results of the samples

| Sample | Upper Layer | Balancing Layer | Lower Layer | $\Delta z_{12}(X)$ (mm) | $\Delta z_{12}(Y)$ (mm) | ISO 23999 (mm) |
|---|---|---|---|---|---|---|
| S4 | COM1 | COM3 | — | 0.26 | 0.70 | 1.11 |
| S5 | COM1 | COM3 | COM1 | 0.25 | 0.13 | 0.44 |
| S6 | COM1 | COM4 | — | 0.47 | 0.72 | 0.99 |

TABLE 8-continued

Material compositions and test results of the samples

| Sample | Upper Layer | Balancing Layer | Lower Layer | $\Delta z_{12}(X)$ (mm) | $\Delta z_{12}(Y)$ (mm) | ISO 23999 (mm) |
|---|---|---|---|---|---|---|
| S7 | COM1 | COM4 | — | 0.29 | 0.46 | 0.46 |
| S8 | COM1 | COM4 | — | 0.14 | 0.13 | 0.049 |

TABLE 9

Material compositions and sample data

| Sample | UL1 | UL2 | BL | LL | GD (mm) |
|---|---|---|---|---|---|
| Q1 | COM4; 1.0 | COM6; 3.0 | COM4; 1.0 | — | 1.7 |
| Q2 | COM4; 1.0 | COM6; 1.0 | COM4; 1.0 | COM6; 2.0 | 1.6 |
| Q3 | COM5; 1.0 | COM6; 3.0 | COM5; 1.0 | — | 2.0 |
| Q4 | COM5; 1.0 | COM6; 1.0 | COM5; 1.0 | COM6; 2.0 | 2.0 |

A pair of samples Q2 and Q4 in accordance with the first aspect were tested with respect to residual indentation by means of the standard ASTM F1914-18 (product specification ASTM F1700). The resilient sample Q2 and the rigid sample Q4 were compared to reference samples Q1 and Q3, respectively, which had a similar layer composition, but were not provided with a lower layer LL present in Q2 and Q4. Each sample Q1-Q4 had two upper layers UL1, UL2, a balancing layer BL and horizontal dimensions 50×50 mm. The grooves in Q2 and Q4 were provided in the lower layer only and the grooves in Q1 and Q3 were fully penetrating the balancing layer BL provided as a bottom layer. An IXPE foam having a thickness of 1.5 mm was used as an underlay, thereby covering the grooves. FIGS. 12a-12d show photos of the samples Q1-Q4, respectively, during the tests.

The compositions COM4 (specified above), COM5 and COM6 were used in the samples. Specified in weight percentages, COM5 comprised 37.59% PVC (Norvinyl™ S6261), 56.38% CaCO$_3$(Greenafiller™ 0-100), 0.21% pigments (Printex™ Carbon Black), 3.76% stabilizer (Baerostab™ CT 1229 P), 0.28% processing aid and lubricant (Baerocid™ SMS 1A), 0.28% lubricant (Baerolub™ PA 200), 1.13% impact modifier (Addstrength™ CPE-3516) and 0.38% impact modifier (Kane Ace™ B580) and COM6 comprised 27.32% PVC (Norvinyl™ S6261), 68.30% CaCO$_3$ (Greenafiller™ 0-100), 0.15% pigments (Printex™ Carbon Black), 2.73% stabilizer (Baerostab™ CT 1229 P), 0.20% processing aid and lubricant (Baerocid™ SMS 1A), 0.20% lubricant (Baerolub™ PA 200), 0.82% impact modifier (Addstrength™ CPE-3516) and 0.27% impact modifier (Kane Ace™ B580).

The material compositions, the layer thicknesses (in mm) and the groove depths GD (in mm) of Q1-Q4 are specified in Table 9. Both of the samples Q1 and Q3 were broken in the test, while the samples Q2 and Q4 resulted in a residual indentation of 2.896% and 1.390%, respectively. Hence, it may be concluded that the sample properties concerning residual indentation was significantly improved when the balancing layer was sandwiched between the upper and lower layer arrangements.

It is noted that similar results may be deduced for the second aspect. Indeed, by analogy, an ordinarily skilled artisan would expect a more intact bottom layer (lower layer or balancing layer) comprising grooves to perform better with regards to residual indentation.

ILLUSTRATIVE EMBODIMENTS

Further aspects of the disclosure are provided below. Embodiments, examples etc. of these aspects are largely analogous to the embodiments, examples, etc. as described above, whereby reference is made to the above for a detailed description.

Item 1. A thermoplastic-based building panel (1), such as a floor panel, comprising:
- an upper layer arrangement (2) comprising at least one upper layer (2a, 2b, 2c),
- a lower layer arrangement (3) comprising at least one lower layer (3a, 3b), and
- a balancing layer (4) being provided between said lower layer arrangement and said upper layer arrangement, wherein the building panel further comprises a groove arrangement (10) comprising at least one groove (11), preferably a plurality of grooves.

Item 2. The building panel according to item 1, wherein the groove arrangement is provided in the lower layer arrangement (3).

Item 3. The building panel according to item 1 or 2, wherein the at least one groove (11) is provided in a rear side (5) of the lower layer arrangement (3), preferably in a bottom layer (5') thereof.

Item 4. The building panel according to any of the preceding items, wherein a groove depth (GD), preferably a maximal groove depth, of the at least one groove is larger than 20%, such as larger than 30% or larger than 40%, of a thickness (T3) of the lower layer arrangement (3) and/or of a thickness (T1) of the building panel.

Item 5. The building panel according to any of the preceding items, wherein a major portion of said grooves are provided entirely below the balancing layer.

Item 6. The building panel according to any of the preceding items, comprising a plurality of grooves in the lower layer arrangement, wherein an innermost portion (11a) of at least one groove is separated from the balancing layer (4) by a distance (Sa) in the vertical direction of the building panel.

Item 7. The building panel according to any of the preceding items, wherein a combined thickness (TL), such as a maximal combined thickness, of the lower layer arrangement (3) and the balancing layer (4), is at least 20%, such as at least 35% or at least 50%, of a thickness (T1) of the building panel.

Item 8. The building panel according to any of the preceding items, wherein a thickness (T4), such as a maximal thickness, of the balancing layer (4) is at least 5%, such as at least 10% or at least 20%, of a thickness (T1) of the building panel.

Item 9. The building panel according to any of the preceding items, wherein a thickness (T4), such as a maximal thickness, of the balancing layer (4) is larger than a thickness (TU) of an upper layer of the upper layer arrangement, said upper layer preferably being an uppermost layer (2a) of the upper layer arrangement.

Item 10. A thermoplastic-based building panel (1), such as a floor panel, comprising:
- an upper layer arrangement (2) comprising at least one upper layer (2a, 2b, 2c), and
- a balancing layer (4) being a bottom layer (5') of the building panel, wherein the building panel further comprises a groove arrangement (10) comprising a plurality of grooves (11), a major portion of said grooves being provided in the balancing layer only.

Item 11. The building panel according to item 10, wherein all of said grooves are provided in the balancing layer only.

Item 12. The building panel according to item 10 or 11, wherein said grooves are provided in a rear side (4a) of the balancing layer.

Item 13. The building panel according to any of the preceding items 10-12, wherein said major portion comprises a major portion of a total volume (TV) of the grooves and/or a major portion of a total number of grooves.

Item 14. The building panel according to any of the preceding items 10-13, wherein a thickness (T4), such as a maximal thickness, of the balancing layer is larger than a thickness (TU) of an upper layer of the upper layer arrangement, said upper layer preferably being an uppermost layer (2a) of the upper layer arrangement.

Item 15. The building panel according to any of the preceding items 10-14, wherein a thickness (T4), such as a maximal thickness, of the balancing layer (4) is at least 20%, such as at least 35% or at least 50%, of a thickness (T1) of the building panel.

Item 16. The building panel according to any of the preceding items 10-15, comprising a plurality of grooves in the balancing layer, wherein an innermost portion (11a) of at least one groove is separated from the upper layer arrangement by a distance (Sb) in the vertical direction of the building panel.

Item 17. The building panel according to any of the preceding items 10-16, wherein a groove depth (GD) of the groove(s) is larger than 20%, such as larger than 30% or larger than 40%, of a thickness (T4) of the balancing layer and/or of a thickness (T1) of the building panel, such as floor panel.

Item 18. The building panel according to any of the preceding items 1-17, comprising a plurality of grooves, wherein a groove depth (GD), preferably a maximal groove depth, of at least two grooves are different.

Item 19. The building panel according to any of the preceding items 1-18, wherein the balancing layer is a continuous layer.

Item 20. The building panel according to any of the preceding items 1-19, comprising at least one reinforcement element, such as a glass-fibre layer.

Item 21. The building panel according to any of the preceding items 1-20, further comprising a mechanical locking system (20) in an edge portion (1a, 1b; 1c, 1d) for horizontally and/or vertically locking the building panel to an adjacent building panel.

Item 22. The building panel according to any of the preceding items 1-21, further comprising a mechanical locking system (20) according to item 23 or any of the items 26-38.

Item 23. A thermoplastic-based building panel (1; 1'), such as a floor panel, comprising:
- an upper layer arrangement (2) and/or a lower layer arrangement (3),
- a balancing layer (4) comprising a thermoplastic polymer, and
- a mechanical locking system (20) for horizontally and/or vertically locking the building panel (1; 1') to an adjacent building panel (1'; 1), the mechanical locking system comprising a cooperating surface (21) provided in an edge portion (1a, 1b; 1c, 1d) of the building panel (1; 1') and being configured to cooperate with a cooperating surface (21) of the adjacent building panel (1'; 1), wherein the cooperating surface (21) of the mechanical locking system (20) is at least partially situated in the balancing layer.

Item 24. The building panel according to item 23, wherein the balancing layer is provided between said lower layer arrangement (3) and said upper layer arrangement (2).

Item 25. The building panel according to item 23, wherein the balancing layer is a bottom layer (5') of the building panel.

Item 26. The building panel according to any of the preceding items 23-25, wherein the balancing layer at least partially extends through a locking element (8; 8') provided on a strip (6; 6') and/or through a locking groove (14; 14') the locking element being configured to engage with the locking groove of said adjacent building panel (1') for horizontal locking.

Item 27. The building panel according to item 26, wherein the cooperating surface is situated on the locking element (8; 8') and/or in the locking groove (14; 14').

Item 28. The building panel according to item 26 or 27, wherein an uppermost surface (8a; 8a') of the locking element comprises a portion of the balancing layer, said cooperating surface preferably being provided in the uppermost surface.

Item 29. The building panel according to any of the preceding items 23-28, wherein the balancing layer at least partially extends along a strip (6; 6'), such as along an upper portion of the strip.

Item 30. The building panel according to item 29, wherein an uppermost surface (6a; 6a') of the strip comprises a portion of the balancing layer, said cooperating surface (21) preferably being provided in the uppermost surface (6a; 6a').

Item 31. The building panel according to any of the preceding items 23-30, wherein the balancing layer at least partially extends through a tongue portion (9; 9'), such as through a lower portion of the tongue portion, the tongue portion being configured to engage with a tongue groove (7; 7') of the adjacent building panel for vertical locking.

Item 32. The building panel according to item 31, wherein the cooperating surface is situated on the tongue portion (9; 9').

Item 33. The building panel according to item 31 or 32, wherein a lowermost surface (9a; 9a') of the tongue portion comprises a portion of the balancing layer, said cooperating surface preferably being provided in the lowermost surface.

Item 34. The building panel according to any of the preceding items 23-33, wherein the cooperating surface (21) is a first cooperating surface provided in a first edge portion (1a, 1b; 1c, 1d) of the building panel and wherein the mechanical locking system further comprises a second cooperating surface provided in a second edge portion (1c, 1d; 1a, 1b) of the building panel, the first and second edge portions preferably being oppositely arranged on the building panel, wherein the second cooperating surface is at least partially situated in the balancing layer (4).

Item 35. The building panel according to any of the preceding items 23-34, wherein the cooperating surface (21) is a locking surface (22; 23) configured to engage with a locking surface (23; 22) of the adjacent building panel in a locked state of the building panel and the adjacent building panel.

Item 36. The building panel according to any of the preceding items 23-35, wherein the cooperating surface (21) is a guiding surface (24; 25) configured to guide the adjacent building panel during locking of the building panel to the adjacent building panel, such as by cooperating or engaging with a cooperating surface (21), such as a guiding surface (25; 24), of the adjacent building panel during locking.

Item 37. The building panel according to any of the preceding items 23-36, wherein the building panel further comprises a groove arrangement (10) comprising at least one groove (11), preferably a plurality of grooves.

Item 38. The building panel according to any of the preceding items 23-37, wherein the building panel and the adjacent building panel are configured to be locked to each other by angling and/or a relative vertical displacement of the building panels towards each other.

Item 39. The building panel according to any of the preceding items 1-38, wherein the upper layer arrangement (2), such as each of said at least one upper layer, comprises a thermoplastic polymer and, optionally, a filler.

Item 40. The building panel according to any of the preceding items 1-39, wherein the upper layer arrangement comprises a wear layer (2a) and/or a print layer (2b), such as a print film.

Item 41. The building panel according to any of the preceding items 1-40, wherein the balancing layer (4) comprises a thermoplastic polymer and, optionally, a filler.

Item 42. The building panel according to any of the preceding items 1-41, wherein the lower layer arrangement (3), such as each of said at least one lower layer, comprises a thermoplastic polymer and, optionally, a filler.

Item 43. The building panel according to any of the preceding items 1-42, wherein an amount of a thermoplastic polymer in the balancing layer is higher than an amount of a thermoplastic polymer in the upper and/or lower layer arrangement.

Item 44. The building panel according to any of the preceding items 1-43, wherein at least one upper and/or lower layer of said building panel is extruded, such as coextruded.

Item 45. The building panel according to any of the preceding items 1-22 or 37-44, wherein the groove arrangement (10) is post-formed after forming the panel (1) per se, preferably by removing material from a bottom layer (5') of the panel.

Item 46. The building panel according to any of the preceding items 1-9 or 37-45, wherein an average groove depth (GA) of a plurality of grooves (11) is smaller than a thickness (T3) of the lower layer arrangement.

Item 47. The building panel according to any of the preceding items 10-22 or 37-45, wherein an average groove depth (GA) of a plurality of grooves (11) is smaller than a thickness (T4) of the balancing layer.

Item 48. The building panel according to any of the preceding claims, comprising a groove arrangement (10) comprising at least one groove (11), wherein the at least one groove (11) includes at least one opening at a bottom-facing surface of the building panel (1).

Item 49. The building panel according to any of the preceding claims, comprising a groove arrangement (10) comprising at least one groove (11), wherein the at least one groove (11) is bounded by a panel portion located below the at least one groove (11).

Item 50. The building panel according to item 35, wherein the locking surface (22) includes an upward-facing horizontal recessed portion of the cooperating surface (21).

Item 51. The building panel according to item 50, wherein the upward-facing horizontal recessed portion is a surface of the balancing layer (4).

Item 52. Panel assembly comprising a building panel (1) and an adjacent building panel (1'), wherein the building panel and/or the adjacent building panel is embodied as the building panel according to any of the preceding items 1-51.

The invention claimed is:

1. A thermoplastic-based building panel comprising:
an upper layer arrangement,
a balancing layer comprising a thermoplastic polymer, and
a mechanical locking system for horizontally and/or vertically locking the building panel to an adjacent building panel, the mechanical locking system comprising a first cooperating surface provided in an edge portion of the building panel and being configured to cooperate with a second cooperating surface of the adjacent building panel,
wherein the first cooperating surface of the mechanical locking system is at least partially situated in the balancing layer,
wherein the balancing layer at least partially extends through a locking groove, and/or through a portion of a locking element extending vertically higher than an uppermost surface of a strip, the strip extending horizontally beyond an upper edge of the edge portion, the locking element being configured to engage with the locking groove of said adjacent building panel for horizontal locking,
wherein: (i) the balancing layer entirely extends vertically below an uppermost surface of the locking groove; and/or (ii) the balancing layer entirely extends vertically above the uppermost surface of the strip.

2. The building panel according to claim 1, further comprising a lower layer arrangement, wherein the balancing layer is located between the upper layer arrangement and the lower layer arrangement.

3. The building panel according to claim 1, wherein the balancing layer is a bottom layer of the building panel.

4. The building panel according to claim 1, wherein the balancing layer is thinner than the upper layer arrangement.

5. The building panel according to claim 1, wherein an uppermost surface of the locking element comprises a portion of the balancing layer, the first cooperating surface being provided in the uppermost surface of the locking element.

6. The building panel according to claim 1, wherein the first cooperating surface is situated on the locking element and/or in the locking groove.

7. The building panel according to claim 1, wherein the balancing layer at least partially extends along the strip, and wherein the uppermost surface of the strip comprises a portion of the balancing layer.

8. The building panel according to claim 7, wherein a transitional surface transitioning from the uppermost surface of the strip to the locking element comprises a portion of the balancing layer.

9. The building panel according to claim 1, wherein the balancing layer at least partially extends along an upper portion of the strip provided horizontally inwardly of the locking element.

10. The building panel according to claim 1, wherein said first cooperating surface is provided in the uppermost surface of the strip.

11. The building panel according to claim 1, wherein the balancing layer at least partially extends through a tongue portion, the tongue portion being configured to engage with a tongue groove of the adjacent building panel for vertical locking.

12. The building panel according to claim 11, wherein the balancing layer at least partially extends through a lower portion of the tongue portion.

13. The building panel according to claim 11, wherein the first cooperating surface is situated on the tongue portion.

14. The building panel according to claim 11, wherein the adjacent building panel is configured to be displaced vertically downwards towards the building panel during locking, the tongue portion comprising a separate tongue configured to be arranged in a displacement groove provided at said edge portion.

15. The building panel according to claim 1, wherein the first cooperating surface is a locking surface configured to engage with a locking surface of the adjacent building panel in a locked state of the building panel and the adjacent building panel.

16. The building panel according to claim 15, wherein the locking surface is a horizontal and/or vertical locking surface for horizontal and/or vertical locking to the adjacent panel, respectively.

17. The building panel according to claim 1, wherein the first cooperating surface is a guiding surface configured to guide the adjacent building panel during locking of the building panel to the adjacent building panel by cooperation with a guiding surface of the adjacent building panel during locking.

18. The building panel according to claim 1, further comprising a groove arrangement comprising at least one groove.

19. The building panel according to claim 1, wherein the building panel is a floor panel.

20. The building panel according to claim 1, wherein the balancing layer entirely extends vertically below the uppermost surface of the locking groove.

21. The building panel according to claim 1, wherein the balancing layer entirely extends vertically above the uppermost surface of the strip.

* * * * *